Figure 1:
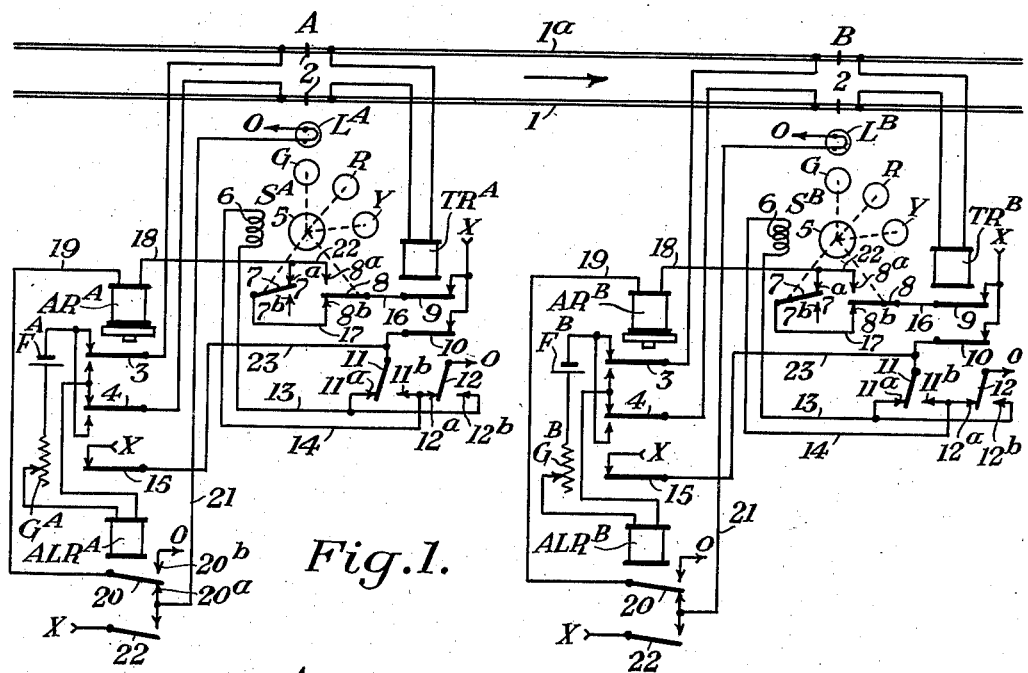

Jan. 17, 1939.   H. S. YOUNG   2,143,967
RAILWAY SIGNALING SYSTEM
Filed Aug. 30, 1934   6 Sheets-Sheet 1

INVENTOR
Henry S. Young.
BY
HIS ATTORNEY

Jan. 17, 1939.    H. S. YOUNG    2,143,967
RAILWAY SIGNALING SYSTEM
Filed Aug. 30, 1934    6 Sheets-Sheet 2

INVENTOR
Henry S. Young.
BY
HIS ATTORNEY

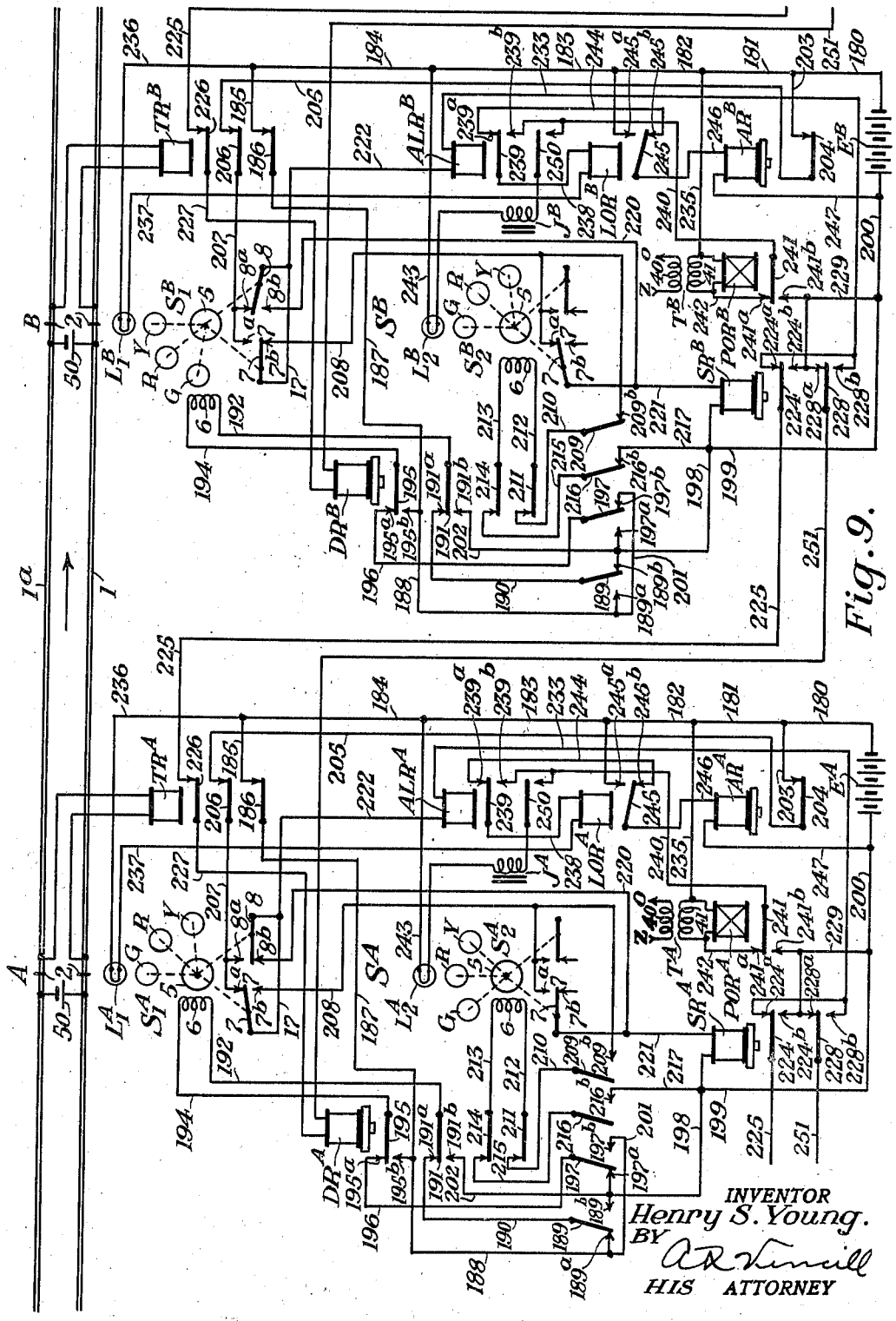

Patented Jan. 17, 1939

2,143,967

UNITED STATES PATENT OFFICE 2,143,967

RAILWAY SIGNALING SYSTEM

Henry S. Young, Wilkinsburg, Pa., assignor to The Union Switch & Signal Company, Swissvale, Pa., a corporation of Pennsylvania Application August 30, 1934, Serial No. 742,095

36 Claims. (Cl. 246—41)

My invention relates to railway signaling systems of the type involving light signals which are approach lighted.

One object of my invention is to provide means for checking the continuity of the lamp filament of a signal of the type described while the lamp is extinguished.

Another object of my invention is to provide a restrictive indication for trains approaching an approach lighted signal having a burned out lamp.

Other objects of my invention will appear as the description proceeds.

I will describe nine forms of signaling systems embodying my invention, and will then point out the novel features thereof in claims.

In the accompanying drawings, Figs. 1 to 8, inclusive, are diagrammatic views showing my invention applied to a plurality of different forms of signaling systems. Figs. 9 and 9ª are diagrammatic views which, when placed end to end with Fig. 9ª on the right, show my invention applied to still another form of signaling system.

Similar reference characters refer to similar parts in each of the several views.

Referring first to Fig. 1, the reference characters 1 and 1ª designate the track rails of a stretch of railway track along which traffic normally moves in the direction indicated by the arrow. These track rails are divided, by means of insulated joints 2, to form blocks, only one of which A—B is shown complete in the drawings. Each block is provided with a polarized track circuit including a polarized track relay, designated by the reference character TR with a suitable distinguishing exponent, and a track battery designated by the reference character F with a suitable distinguishing exponent. Each track relay is connected directly with the rails of the associated block adjacent the entrance end of the block, while each track battery is connected with the rails of the associated block adjacent the exit end of the block in series with an adjustable resistor designated by the reference character G with a suitable distinguishing exponent, the winding of an approach lighting relay, designated by the reference character ALR with a suitable distinguishing exponent, and the pole-changing contacts 3 and 4 of an auxiliary relay designated by the reference character AR with a suitable distinguishing exponent.

Located adjacent the entrance end of each block is a signal designated by the reference character S with an exponent corresponding to the location. Each signal, as here shown, is of the type commonly known as a searchlight signal, and comprises an armature 5 mounted to rotate between an intermediate position to which it is biased, and two extreme positions. Each armature 5 is controlled by an armature winding 6, and is polarized by the field from a permanent magnet or an electromagnet (not shown) in such a manner that when the winding 6 is energized, the armature 5 will rotate to its righthand or left-hand extreme position according as winding 6 is then supplied with current of normal or reverse polarity, respectively. Attached to each armature 5 to rotate therewith are three colored roundels G, R, and Y, which are arranged to be disposed in the path of a beam of light projected from an associated lamp L according as the armature 5 occupies its right-hand extreme position, its intermediate position or its left-hand extreme position, respectively. For convenience in illustration, each lamp L in the drawing is shown disposed above the associated roundels, but it will be readily understood that in actual practice each lamp will be located directly back of the associated roundel and will have associated therewith a suitable optical system, not shown, for projecting a beam of light from the lamp. The signals S each indicate "proceed", "stop" or "caution" according as the roundel G, R, or Y is in front of the associated lamp L when this lamp is lighted. Operatively connected with each armature 5 is a circuit controller comprising two movable contact fingers 7 and 8. The movable contact finger 7 cooperates with a fixed contact 7ª to close a contact 7—7ª when the armature occupies its right-hand extreme position, and with a fixed contact 7ᵇ to close a contact 7—7ᵇ when the armature occupies its intermediate position or its left-hand extreme position; while the movable contact finger 8 cooperates with a fixed contact 8ª to close a contact 8—8ª when the armature occupies its left-hand extreme position, and with a fixed contact 8ᵇ to close a contact 8—8ᵇ when the armature occupies its intermediate or its right-hand extreme position. A signal of the type described is disclosed and claimed in Letters Patent of the United States No. 1,864,224, granted to Wesley B. Wells, on June 21, 1932, for Light signals.

The winding 6 of each signal S is provided with a normal energizing circuit which is closed when the associated track relay TR is energized by current of normal polarity; with a reverse energizing circuit which is closed when the associated track relay TR is energized by current of reverse polarity; with a first auxiliary energizing circuit which is closed when the normal contacts of the associated track relay and the front contacts of the associated auxiliary relay AR are closed; and with a second auxiliary circuit which is closed when the reverse contacts of the associated track relay TR are closed, and the front contacts of the associated auxiliary relay AR are closed. Referring particularly to signal $S^A$, the normal energizing circuit for winding 6 of this signal passes from terminal X of a suitable source of current not shown in the drawings through front contact 10 of track relay $TR^A$, normal contact 11—11$^a$ of track relay $TR^A$, wire 13, winding 6 of signal $S^A$, wire 14, and normal contact 12—12$^a$ of signal $S^A$ to the other terminal O of the source. The reverse energizing circuit for winding 6 of signal $S^A$ passes from terminal X through front contact 10 of track relay $TR^A$, reverse contact 11—11$^b$ of track relay $TR^A$, wire 14, winding 6 of signal $S^A$, wire 13, and reverse contact 12—12$^b$ of track relay $TR^A$ to terminal O. The first auxiliary circuit for winding 6 of signal $S^A$ passes from terminal X through contact 15 of auxiliary relay $AR^A$, wire 23, normal contact 11—11$^a$ of track relay $TR^A$, wire 13, winding 6 of signal $S^A$, wire 14, and normal contact 12—12$^a$ of track relay $TR^A$ to terminal O. The second auxiliary circuit for winding 6 of signal $S^A$ passes from terminal X through front contact 15 of auxiliary relay $AR^A$, wire 23, reverse contact 11—11$^b$ of track relay $TR^A$, wire 14, winding 6 of signal $S^A$, wire 13, and reverse contact 12—12$^b$ of track relay $TR^A$ to terminal O.

When either the normal or first auxiliary energizing circuit for the winding 6 of signal $S^A$ is closed, the winding of this signal is supplied with current of normal polarity and it will be apparent, therefore, that if the associated lamp $L^A$ is then lighted, the signal will display a proceed indication. Likewise, when either the reverse or second auxiliary circuit for winding 6 of signal $S^A$ is closed, this winding is then supplied with current of reverse polarity, and as a result, if the associated lamp $L^A$ is then lighted, the signal will display a caution indication.

Each auxiliary relay is controlled by the associated track relay TR, by the circuit controller and the lamp of the associated signal S, and by the associated approach lighting relay ALR. The above method of control as well as apparatus involved embody my present invention. Referring particularly to auxiliary relay $AR^A$, this relay is provided with a first circuit which passes from terminal X through front contact 9 of track relay $TR^A$, wire 16, contact 8—8$^b$ of signal $S^A$, wire 17, contact 7—7$^a$ of signal $S^A$, wire 18, winding of relay $AR^A$, wire 19, back contact 20—20$^a$ of approach lighting relay $ALR^A$, wire 21, and the filament of lamp $L^A$ to terminal O. Relay $AR^A$ is also provided with a second circuit which is similar to the circuit just traced with the exception that this latter circuit includes a contact 8—8$^a$ of signal $S^A$ and a wire 22 in place of contact 8—8$^b$ of signal $S^A$, wire 17, and contact 7—7$^a$ of signal $S^A$. Relay $AR^A$ is further provided with a third circuit which passes from terminal X, through front contact 9 of track relay $TR^A$, wire 16, contact 8—8$^b$ of signal $S^A$, wire 17, contact 7—7$^a$ of signal $S^A$, wire 18, winding of relay $AR^A$, wire 19, and front contact 20—20$^b$ of relay $ALR^A$ to terminal O; and with a fourth circuit which is similar to the third circuit with the exception that this latter circuit includes contact 8—8$^a$ of signal $S^A$ and wire 22 in place of contact 8—8$^b$ of signal $S^A$, wire 17, and contact 7—7$^a$ of signal $S^A$.

Each auxiliary relay has a resistance which is sufficiently high so that when either of the circuits for the relay including the associated lamp L are closed, the lamp will remain extinguished. Furthermore, each auxiliary relay is made sufficiently slow releasing so that when the energizing circuits for the relay are interrupted due either to the polarity of the current which is supplied to the associated track relay becoming reversed, or to the associated approach lighting relay picking up or releasing its armature, the front contacts of such auxiliary relay will remain closed.

Each signal lamp L is provided with an energizing circuit which is controlled by the associated approach lighting relay ALR, and which passes from terminal X, through front contact 22 of the associated relay ALR, wire 21, and the filament of the lamp to terminal O.

Each approach lighting relay is so designed and the parts are so proportioned that when the track circuit in which it is included is unoccupied the current which then flows in its winding will be insufficient to pick up its armature and cause it to close its front contacts, but that, when the track circuit in which it is included is occupied by a train, the increased current which then flows in its winding due to the train shunt will be sufficient to cause it to pick up its armature and close its front contacts. It follows that each signal lamp will only be lighted when the block in the rear of the associated signal is occupied by a train.

As shown in the drawings, all parts are in their normal positions. That is to say, track relays $TR^A$ and $TR^B$ are both energized by current of normal polarity, so that the armatures 5 of signals $S^A$ and $S^B$ both occupy their right-hand positions, auxiliary relays $AR^A$ and $AR^B$ are both energized, the approach lighting relays $ALR^A$ and $ALR^B$ are both deenergized, and the lamps $L^A$ and $L^B$ are both extinguished.

In explaining the operation of the apparatus as a whole, I will first assume that a train moving toward the right traverses the stretch of track shown in the drawings. When the train enters the block to the left of point A, the increased current which then flows in the winding of relay $ALR^A$ due to the train shunt will cause this relay to open its back contact 20—20$^a$ and close its front contacts 20—20$^b$ and 22. The opening of back contact 20—20$^a$ will interrupt the circuit which was previously closed for auxiliary relay $AR^A$ at this contact, while the closing of front contact 20—20$^b$ will close the previously traced circuit for relay $AR^A$ including front contact 20—20$^b$ of relay $ALR^A$ and front contact 9 of track relay $TR^A$. Relay $AR^A$ will not open its front contacts under these conditions, however, due to its slow releasing characteristics. The closing of front contact 22 of approach lighting relay $ALR^A$ will complete the circuit for lamp $L^A$, and this lamp will therefore become lighted, thus causing signal $S^A$ to indicate proceed.

When the train enters block A—B, track relay $TR^A$ will become deenergized and approach lighting relay $ALR^B$ will become energized. The deenergization of track relay $TR^A$ will cause auxiliary relay $AR^A$ to become deenergized, and when this occurs, winding 6 of signal $S^A$ will become deenergized because the normal and reverse energizing circuits for this winding will then both be open at front contact 10 of track TR^A, and both auxiliary energizing circuits will be open at front contact 15 of relay AR^A. Armature 5 of signal S^A will therefore move to its intermediate position, thus causing signal S^A to indicate stop. The deenergization of auxiliary relay AR^A will also cause the polarity of the current supplied to the track circuit for the block in the rear of block A—B to become reversed. The energization of approach lighting relay ALR^B will cause lamp L^B to become lighted, and the lighting of this lamp, in turn, will cause signal S^B to indicate proceed. When the train has passed completely out of the block to the left of block A—B, approach lighting relay ALR^A will become deenergized, and will extinguish lamp L^A, unless, of course, a following train has previously entered the block.

When the train enters the block to the right of block A—B, track relay TR^B will become deenergized, and will deenergize auxiliary relay AR^B which, in turn, will deenergize winding 6 of signal S^B. The deenergization of winding 6 of signal S^B will cause this signal to move to its stop position, while the deenergization of relay AR^B will reverse the polarity of the current supplied to the track circuit for block A—B. When the train has completely passed out of block A—B, track relay TR^A will pick up in the reverse direction since the associated track circuit is then supplied with current of reverse polarity, and when this happens, signal S^A will move to its caution position and auxiliary relay AR^A will pick up. The picking up of auxiliary relay AR^A will cause the track circuit for the block in the rear of block A—B to again be supplied with current of normal polarity. When the train leaves the block to the right of block A—B, track relay TR^B will become energized in the reverse direction in the same manner that track relay TR^A became energized in the reverse direction when the train left block A—B, and when this happens, signal S^B will move to its caution position due to the resultant energization of winding 6 of this signal in its reverse direction. Furthermore, when track relay TR^B becomes energized in its reverse direction, auxiliary relay AR^B will become energized and will cause the polarity of the current which is supplied to track relay TR^A to become normal. Track relay TR^A is of the usual type wherein when the polarity of the current supplied to the relay is reversed, the neutral contacts open before the polar contacts start to reverse, and remain open until after the polar contacts are completely reversed. If the auxiliary circuits previously traced for winding 6 of signal S^A were not provided, when the polarity of the current supplied to track relay TR^A becomes reversed under these conditions, winding 6 of signal S^A would become deenergized, and would remain deenergized during the entire time the neutral contacts of the track relay are open, which time might be sufficiently long, so that if lamp L^A were then lighted, as would be the case if the block to the left of block A—B were then occupied, an undesirable momentary stop indication might be given. However, due to the fact that the auxiliary circuits for winding 6 of signal S^A are provided, this winding only remains deenergized under these conditions for the brief interval of time required for the polar contacts of track relay TR^A to reverse, which interval is too short to cause a momentary stop indication.

When the train passes out of the second block in advance of block A—B, track relay TR^B will again become energized in the normal direction, and will cause winding 6 of signal S^A to continue energized in its normal direction in a manner which will be obvious from the foregoing, and when this happens, all parts will be restored to the positions in which they are shown in the drawings.

I will now assume that with the parts in the positions in which they are shown in the drawings, lamp L^B burns out, and that a train subsequently enters the block to the left of point A. When lamp L^B burns out, the circuit over which auxiliary relay AR^B was previously energized will become interrupted at the lamp filament, and auxiliary relay AR^B will therefore become deenergized, and will reverse the polarity of the current supplied to track relay TR^A, thus causing track relay TR^A to open its normal contacts and close its reverse contacts. The closing of the reverse contacts of track relay TR^A will cause winding 6 of signal S^A to become energized in the reverse direction, and as a result, when the train enters the block to the left of point A and causes approach lighting relay ALR^A to become energized and complete the circuit for lamp L^A, signal S^A will indicate caution even though neither of the two blocks in advance of location A are occupied.

It will be seen, therefore, that with a signal system constructed in the manner described, if the lamp of a signal burns out when the signal in the rear occupies its proceed position, the signal mechanism in the rear will immediately move to its caution position, thus insuring that an engineman will not be required to pass a signal which indicates proceed, only to find the signal next in advance dark. Since operating rules usually require that a dark signal be obeyed as a stop signal, the arrangement herein disclosed aids in removing the operating hazard incident to an unexpected brake application.

Figure 2:
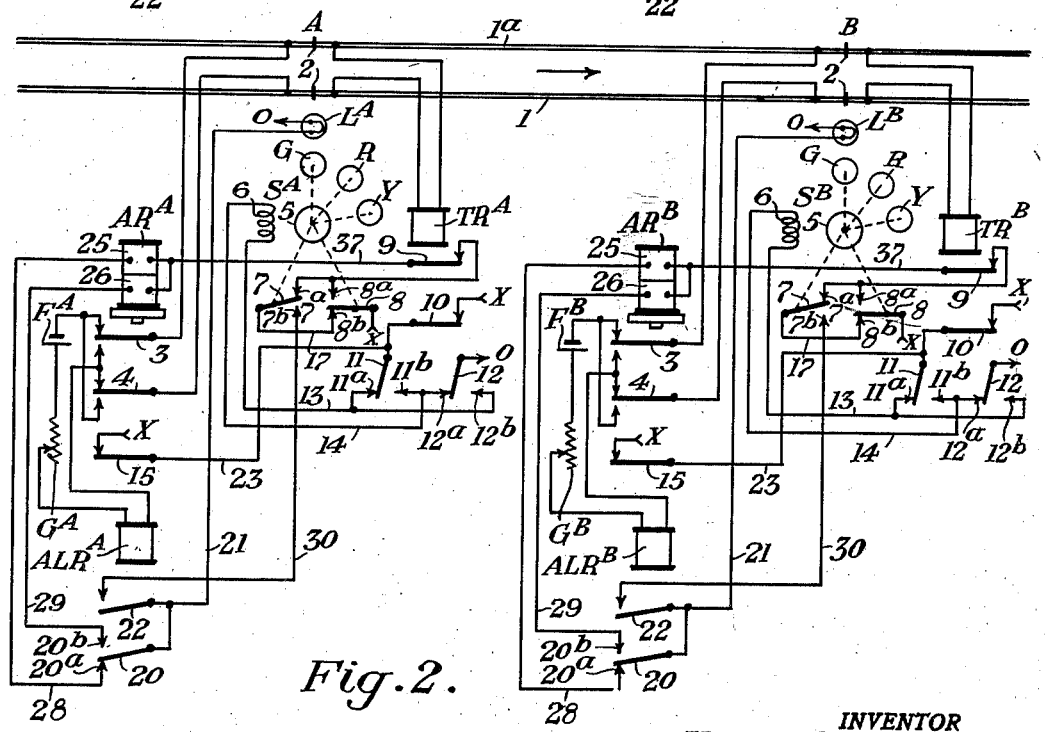

Referring now to Fig. 2, as here shown, the track circuits and signals are similar to those shown in Fig. 1, and the signals are controlled by the track relays TR and auxiliary relays AR in the same manner as shown in Fig. 1. The auxiliary relays AR, however, are constructed and controlled somewhat differently from the auxiliary relays shown in Fig. 1, and the lighting of the lamps L to provide a signal indication upon the approach of a train is accomplished in a somewhat different manner from that shown in Fig. 1.

As illustrated in Fig. 2, each auxiliary relay is provided with two windings, one of which, 25, has a resistance sufficiently high so that when this winding is connected in series with the filament of the associated lamp L in either of two energizing circuits which are provided for this winding, the lamp will not become lighted; and the other of which, 26, has a resistance sufficiently low so that when this winding is connected in series with the associated lamp in either of the two energizing circuits which are provided for this winding, the lamp will become lighted. The energizing circuits for the two windings of each auxiliary relay are similar to the corresponding circuits for each of the other auxiliary relays, and it is believed, therefore, that a description of the circuits for one relay will suffice for all.

Referring particularly to the relay AR^A, the one energizing circuit for winding 25 of this relay is closed when track relay TR^A is energized in its normal direction so that signal S^A occupies its proceed position, and approach lighting relay ALR^A is deenergized, and this circuit passes from terminal X through contact 8—8ᵇ of signal Sᴬ, wire 17, contact 7—7ᵃ of signal Sᴬ, front contact 9 of track relay TRᴬ, wire 37, winding 25 of relay ARᴬ, wire 28, back contact 20—20ᵃ of relay ALRᴬ, wire 21, and the filament of lamp Lᴬ to terminal O. The other energizing circuit for winding 25 of relay ARᴬ is closed when track relay TRᴬ is energized in its reverse direction so that signal Sᴬ occupies its caution position and approach lighting relay ALRᴬ is deenergized, and is similar to the circuit just traced with the exception that this latter circuit includes contact 8—8ᵃ of signal Sᴬ in place of contact 8—8ᵇ of signal Sᴬ, wire 17, and contact 7—7ᵃ of signal Sᴬ. The one energizing circuit for winding 26 of relay ARᴬ is closed when track relay TRᴬ is energized in its normal direction so that signal Sᴬ occupies its proceed position, and relay ALRᴬ is energized, and passes from terminal X, through contact 8—8ᵇ of signal Sᴬ, wire 17, contact 7—7ᵃ of signal Sᴬ, front contact 9 of track relay TRᴬ, wire 37, winding 26 of relay ARᴬ, wire 29, front contact 20—20ᵇ of relay ALRᴬ, wire 21, and the filament of lamp Lᴬ to terminal O. The other circuit for winding 26 of relay ARᴬ is closed when track relay TRᴬ is energized in its reverse direction so that signal Sᴬ indicates caution, and relay ALRᴬ is picked up, and is similar to the circuit just traced with the exception that this latter circuit includes contact 8—8ᵃ of signal Sᴬ in place of contact 8—8ᵇ of signal Sᴬ, wire 17, and contact 7—7ᵃ of signal Sᴬ.

It should be pointed out that since each of the circuits for relay ARᴬ includes the filament of lamp Lᴬ, if this filament should burn out when any one of these circuits is closed, relay ARᴬ will become deenergized and will cause the polarity of the current which is supplied to the block to the left of point A to become pole-changed.

For the reasons previously pointed out, the lamp Lᴬ will be lighted when either one of the circuits for winding 26 of relay ARᴬ is closed. In addition, this lamp will also be lighted when signal Sᴬ indicates stop, and relay ALRᴬ is picked up by virtue of a circuit which passes from terminal X through contact 8—8ᵇ of signal Sᴬ, wire 17, contact 7—7ᵇ of signal Sᴬ, wire 30, front contact 22 of relay ALRᴬ, wire 21, and the filament of lamp Lᴬ to terminal O.

As shown in Fig. 2, all parts are in their normal positions. When a train enters the block to the left of point A, relay ALRᴬ will pick up, thereby opening its back contact 20—20ᵃ and closing its front contacts 20—20ᵇ and 22. The opening of back contact 20—20ᵃ will interrupt the circuit which was previously closed for winding 25 of relay ARᴬ, while the closing of front contact 20—20ᵇ will complete one of the circuits for winding 26 of this relay. When the circuit for winding 26 becomes completed, lamp Lᴬ will become lighted, and since the signal Sᴬ then occupies its proceed position, the signal will display a proceed indication.

When the train enters block A—B, track relay TRᴬ will become deenergized, and approach lighting relay ALRᴮ will pick up its armature. The deenergization of track relay TRᴬ will interrupt the circuit which was previously closed for winding 26 of relay ARᴬ, and this relay will, therefore, become deenergized. When relay ARᴬ becomes deenergized, winding 6 of signal Sᴬ will also become deenergized, thus causing signal Sᴬ to move to its stop position. When signal Sᴬ reaches its stop position, the closing of contact 7—7ᵇ of the signal will complete the previously traced circuit for lamp Lᴬ including front contact 22 of approach lighting relay ALRᴬ. It will be apparent, therefore, that when the train enters block A—B, the lamp Lᴬ will be deenergized for a very brief interval, but this interval will be insufficient to cause a dark signal. When the train has completely entered block A—B, approach lighting relay ALRᴬ will release, and will interrupt the circuit which was previously closed for lamp Lᴬ at front contact 22 of this relay, and lamp Lᴬ will then become extinguished. The energization of approach lighting relay ALRᴮ due to the entrance of the train into block A—B will interrupt the circuit which was previously closed for winding 25 of relay ARᴮ, and will complete one of the circuits for winding 26 of relay ARᴮ. When the circuit for winding 26 of relay ARᴮ becomes closed, lamp Lᴮ will become lighted, and will cause signal Sᴮ to display a proceed indication.

When the train enters the block to the right of point B, the resultant deenergization of track relay TRᴮ will cause winding 26 of relay ARᴮ to become deenergized which, in turn, will cause signal Sᴮ to move to its stop position. Furthermore, when winding 26 becomes deenergized, lamp Lᴮ will become deenergized, but as soon as signal Sᴮ reaches its stop position, this lamp will again become energized in the same manner that the lamp Lᴬ became energized when the train entered block A—B. When the train leaves block A—B, approach lighting relay ALRᴮ will become deenergized, and track relay TRᴬ will become energized in the reverse direction. The energization of track relay TRᴬ in the reverse direction will cause signal Sᴬ to move from its stop position to its caution position, and when the signal reaches its caution position, the previously described circuit for winding 25 of relay ARᴬ including contact 8—8ᵃ of signal Sᴬ will become closed, thus causing relay ARᴬ to pick up and supply the rails of the block to the left of point A with current of normal polarity.

When the train leaves the block to the right of point B, track relay TRᴮ will become energized in its reverse direction which will cause signal Sᴮ to move to its caution position. When the signal reaches its caution position, winding 25 of relay ARᴮ will become energized, thus causing this relay to pick up its armature. When this relay picks up its armature, track relay TRᴬ will become energized in the normal direction, thus causing signal Sᴬ to move to its proceed position. When the signal reaches its proceed position, winding 25 of relay ARᴬ will then be energized over the previously described circuit including contacts 8—8ᵇ and 7—7ᵃ of signal Sᴬ. When the train has passed completely out of the second block in advance of point B, track relay TRᴮ will become energized in its normal direction, which will cause the signal Sᴮ to move to its proceed position. When signal Sᴮ reaches its proceed position, winding 25 of relay ARᴮ will become energized over the circuit which is shown closed in the drawings, and all parts will then be restored to the positions in which they are illustrated in the drawings.

If, with the apparatus constructed as shown in the drawings, the lamp Lᴮ should burn out when any one of the circuits for either winding 25 or winding 26 of relay ARᴮ are closed, relay ARᴮ will become deenergized, and the deenergization of this relay will cause track relay TRᴬ to be supplied with current of reverse polarity. As a result, this relay will reverse its polar contacts and cause signal Sᴬ to move from its proceed position to its caution position unless the parts are already in these positions. As a result, if a train then enters the block to the left of point A and causes lamp $L^A$ to become lighted, the signal will display a caution indication, thus precluding the possibility of the engineman passing the signal $S^A$ when it indicates proceed and finding the signal $S^B$ dark.

One advantage of the apparatus shown in Fig. 2, over that shown in Fig. 1, is that with the apparatus shown in Fig. 2, each auxiliary relay AR will function to check the continuity of the filament of the lamp for the associated signal even though the associated approach lighting relay ALR should become falsely energized for any reason.

Figure 3:
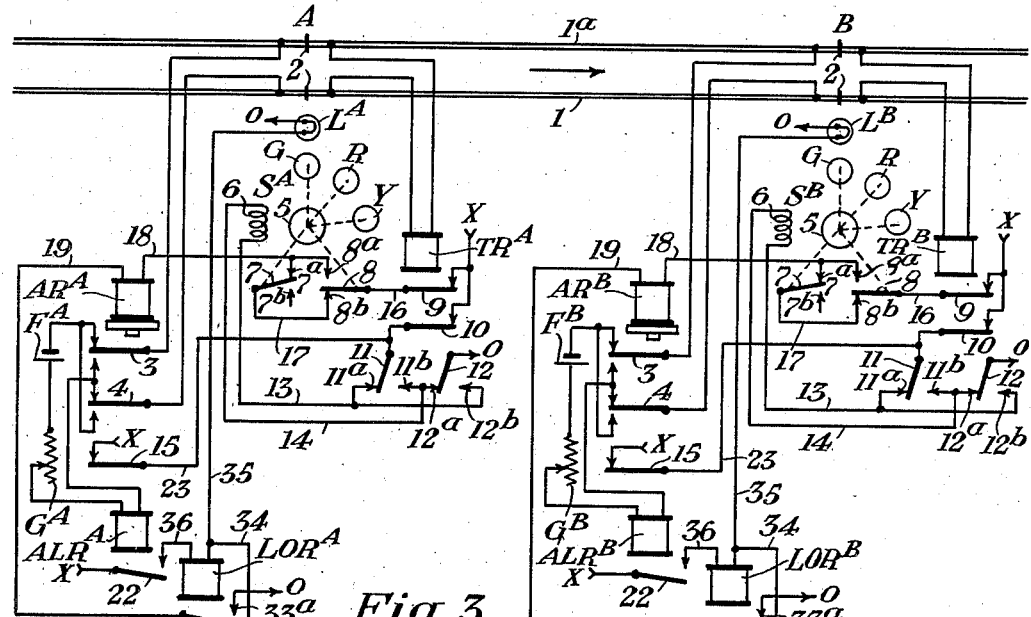

Referring now to Fig. 3, the track circuits and signals, as well as the control circuits for the signals are again similar to those shown in Fig. 1. Each auxiliary relay AR, however, instead of being controlled in part by the associated approach lighting relay ALR in the manner shown in Fig. 1, is controlled in part by an associated light-out relay, designated by the reference character LOR with a suitable distinguishing exponent, which light-out relay is connected in series with the associated lamp L whenever a train approaches the signal of which the lamp forms a part.

Referring particularly to the apparatus located at point A, relay $AR^A$ is provided with a first circuit which is closed when track relay $TR^A$ is energized in its normal direction so that signal $S^A$ occupies its proceed position, and light-out relay LOR is deenergized, and which circuit passes from terminal X, through front contact 9 of track relay $TR^A$, wire 16, contact 8—8$^b$ of signal $S^A$, wire 17, contact 7—7$^a$ of signal $S^A$, wire 18, winding of relay $AR^A$, wire 19, back contact 33—33$^b$ of light-out relay $LOR^A$, wires 34 and 35, and the filament of lamp $L^A$ to terminal O. Relay $AR^A$ is also provided with a second circuit which is closed when track relay $TR^A$ is energized in the reverse direction so that signal $S^A$ occupies its caution position, and light-out relay LOR is deenergized, and which circuit is similar to the circuit just traced with the exception that this latter circuit includes contact 8—8$^a$ of signal $S^A$ in place of contact 8—8$^b$ of signal $S^A$, wire 17, and contact 7—7$^a$ of signal $S^A$. Relay $AR^A$ is further provided with a third circuit which is energized when track relay $TR^A$ is energized in its normal direction so that signal $S^A$ occupies its proceed position, and light-out relay $LOR^A$ is energized, and with a fourth circuit which is closed when track relay $TR^A$ is energized in its reverse direction so that signal $S^A$ occupies its caution position, and light-out relay $LOR^A$ is energized. The third circuit for relay $AR^A$ passes from terminal X, through front contact 9 of track relay $TR^A$, wire 16, contact 8—8$^b$ of signal $S^A$, wire 17, contact 7—7$^a$ of signal $S^A$, wire 18, winding of relay $AR^A$, wire 19, and front contact 33—33$^a$ of relay $LOR^A$ to terminal O. The fourth circuit for relay $AR^A$ is similar to the third circuit just traced with the exception that this latter circuit includes contact 8—8$^a$ of signal $S^A$ in place of contact 8—8$^b$ of signal $S^A$, wire 17, and contact 7—7$^a$ of signal $S^A$.

The energizing circuit for lamp $L^A$ as here shown passes from terminal X through front contact 22 of relay $ALR^A$, wire 36, winding of relay $LOR^A$, wire 35, and the filament of lamp $L^A$ to terminal O. Since this circuit includes light-out relay $LOR^A$, it follows that relay $LOR^A$ will be energized whenever relay $ALR^A$ is energized provided that the filament of lamp $L^A$ is intact.

To explain the operation of the system shown in Fig. 3, I will assume that block A—B is occupied by a train, that the block in the rear of block A—B is unoccupied, and that traffic conditions in advance of block A—B are such that track relay $TR^B$ is energized in its normal direction. Under these conditions, approach relay $ALR^B$ will be energized because of the presence of the train in block A—B, and the circuit for lamp $L^B$ will therefore be closed at front contact 22 of relay $ALR^B$. Lamp $L^B$ will therefore be lighted, and light-out relay $LOR^B$ will be energized. Signal $S^B$ will occupy its proceed position, and since lamp $L^B$ is lighted, this signal will display a proceed indication. Auxiliary relay $AR^B$ will be energized over the circuit including contacts 8—8$^b$ and 7—7$^a$ of signal $S^B$, and front contact 33—33$^a$ of light-out relay $LOR^B$. Track relay $TR^A$ will be deenergized, and auxiliary relay $AR^A$ will therefore also be deenergized. With relays $TR^A$ and $AR^A$ both deenergized, all circuits for winding 6 of signal $S^A$ will be open, and signal $S^A$ will therefore occupy its stop position. Approach lighting relay $ALR^A$ will be deenergized, and lamp $L^A$ and light-out relay $LOR^A$ will therefore both also be deenergized. Since lamp $L^A$ is deenergized, signal $S^A$ will, of course, be dark.

When the train enters the block to the right of block A—B, track relay TRB will become deenergized and will deenergize relay $AR^B$. Signal $S^B$ will therefore move to its stop position, since all circuits for winding 6 of this signal will then be open. When the train has passed completely out of block A—B, approach lighting relay $ALR^B$ will release its armature, and track relay $TR^A$ will become energized in the reverse direction. The releasing of the armature of approach lighting relay $ALR^B$ will interrupt the circuit which was previously closed for lamp $L^B$, and lamp $L^B$ will then become extinguished and light-out relay $LOR^B$ will become deenergized. The energization of track relay $TR^A$ in its reverse direction will cause signal $S^A$ to move to its caution position, and when the signal reaches its caution position, auxiliary relay $AR^A$ will become energized over the circuit including contact 8—8$^a$ of signal $S^A$ and back contact 33—33$^b$ of relay $LOR^A$. The energization of relay $AR^A$ will cause current of normal polarity to be supplied to the rails of the block in the rear of block A—B.

When the train leaves the first block in advance of block A—B, track relay $TR^B$ will become energized in its reverse direction, which will cause signal $S^B$ to move to its caution position. When signal $S^B$ reaches its caution position, relay $AR^B$ will become energized and will reverse the polarity of the current supplied to track relay $TR^A$, so that this latter relay will now become energized in its normal direction. The energization of track relay $TR^A$ in its normal direction will cause signal $S^A$ to move to its proceed position, and when this signal moves to its proceed position, the circuit which was previously closed for relay $AR^A$ at contact 8—8$^a$ of signal $S^A$ will become interrupted, and the circuit for this relay including contact 8—8$^b$ and 7—7$^a$ of signal $S^A$ will become closed. Relay $AR^A$, however, will not open its front contacts due to its slow releasing characteristics.

When the train passes out of the second block in advance of block A—B, track relay $TR^B$ will become energized in its normal direction, and will cause signal $S^B$ to move to its proceed position. This movement of signal $S^B$ to its proceed position will cause the circuit for relay $AR^B$ including contact 8—8$^a$ of signal $S^B$ to become interrupted, and the circuit for this relay including contacts 8—8$^b$ and 7—7$^a$ of signal S$^B$ to become closed, but relay AR$^B$ will not open its front contacts. When the circuit for relay AR$^B$ including contacts 8—8$^b$ and 7—7$^a$ becomes closed, all parts will be restored to their normal positions in which they are shown in the drawings.

It should be particularly pointed out that with the apparatus constructed as shown in Fig. 3, if a signal lamp should burn out when the block in the rear of the associated signal is unoccupied, the auxiliary relay associated with the signal will become deenergized and will reverse the polarity of the current supplied to the track relay for the block in the rear, thus causing the signal in the rear to move to its caution position. For example, assuming that lamp L$^B$ burns out when the parts are in the positions in which they are shown in the drawings, relay AR$^B$ will become deenergized and will reverse the polarity of the current supplied to track relay TR$^A$ thus causing this relay to reverse its polar contacts, and hence causing signal S$^A$ to move to its caution position. As a result, when a train subsequently enters the block in the rear of block A—B and causes lamp L$^A$ to become lighted, signal S$^A$ will display a caution indication, thus warning the trainman to be prepared to stop at the next signal, and hence avoiding the undesirable condition of passing signal S$^A$ at proceed, and having to stop when the train reaches signal S$^B$, as would be the case were my present invention not used.

It should also be pointed out that with the apparatus constructed as shown in Fig. 3, if an approach lighting relay ALR should become falsely energized when the associated signal lamp is burned out, the associated approach lighting relay LOR will remain deenergized and the associated auxiliary relay AR will therefore function to cause the signal for the block in the rear to move to its caution position in the manner just described in spite of the false energization of the approach lighting relay. For example, if approach lighting relay ALR$^B$ should become falsely picked up when block A—B is unoccupied by a train, and lamp L$^B$ is burned out, light-out relay LOR$^B$ would remain deenergized, and relay AR$^B$ would, therefore, become deenergized in the manner previously described, and would reverse the polarity of the current supplied to track relay TR$^A$, thus causing signal S$^A$ to move to its caution position.

Figure 4:
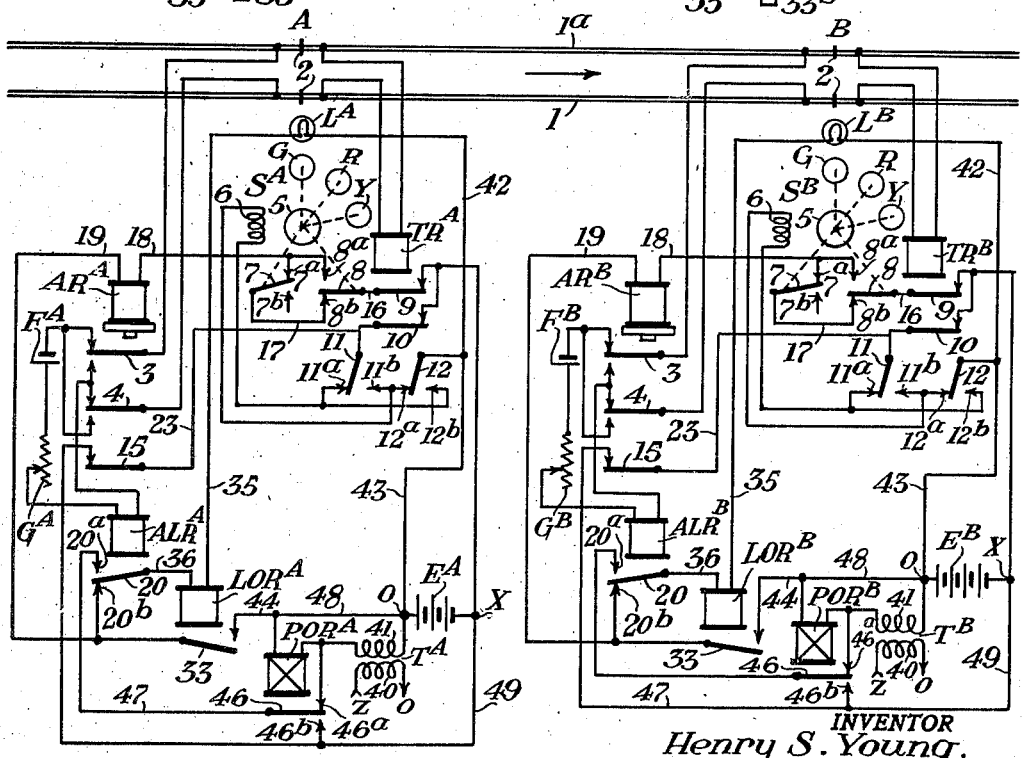

Referring now to Fig. 4, in the modified form of the apparatus here illustrated, there is provided at each signal location, in addition to the apparatus shown in Fig. 3, a transformer designated by the reference character T with a suitable distinguishing exponent, and a "power-off" relay designated by the reference character POR with a suitable distinguishing exponent. The primary winding 40 of each transformer T is constantly connected with the terminals Z and O of a suitable source of alternating current not shown in the drawings, while the secondary winding 41 of each transformer T is constantly connected with the winding of the associated power-off relay. It will be seen, therefore, that each power-off relay will be energized at all times except in the event that the alternating current supply fails.

Each auxiliary relay, as shown in Fig. 4, is controlled by the associated signal S, by the associated track relay TR, by the associated approach lighting relay ALR and by the associated light-out relay LOR. Referring to relay AR$^A$, for example, this relay is provided with one circuit which passes from terminal X of a battery E$^A$, through front contact 9 of track relay TR$^A$, wire 16, contact 8—8$^b$ of signal S$^A$, wire 17, contact 7—7$^a$ of signal S$^A$, wire 18, winding of relay AR$^A$, wire 19, back contact 20—20$^b$ of relay ALR$^A$, wire 36, winding of relay LOR$^A$, wire 35, filament of lamp L$^A$, and wires 42 and 43 back to terminal O of battery E$^A$. Relay AR$^A$ is also provided with another circuit which is similar to the circuit just traced with the exception that this latter circuit includes contact 8—8$^a$ of signal S$^A$ in place of contact 8—8$^b$ of signal S$^A$, wire 17, and contact 7—7$^a$ of signal S$^A$. Relay AR$^A$ is further provided with two other circuits, one of which passes from terminal X of battery E$^A$, through front contact 9 of track relay TR$^A$, wire 16, contact 8—8$^b$ of signal S$^A$, wire 17, contact 7—7$^a$ of signal S$^A$, wire 18, winding of relay AR$^A$, wire 19, front contact 33 of light-out relay LOR$^A$ and wires 44 and 48 to terminal O of battery E$^A$. The remaining circuit for relay AR$^A$ is similar to the circuit last traced with the exception that this circuit includes contact 8—8$^a$ of signal S$^A$ in place of contact 8—8$^b$, wire 17, and contact 7—7$^a$ of signal S$^A$. When any one of the circuits just traced for relay AR$^A$ is closed, this relay will, of course, be picked up.

It will be noted that the two circuits first traced for relay AR$^A$ each include the winding of light-out relay LOR$^A$. The winding of light-out relay LOR$^A$ has a low resistance, and the parts are so proportioned that when either circuit for relay AR$^A$ including this winding is closed, relay LOR$^A$ will not be energized to a sufficient extent to cause it to pick up its armature and close its front contact.

It will also be noted that the two circuits first traced for relay AR$^A$ each includes the filament of lamp L$^A$, and it follows that if this lamp burns out when either of these circuits are closed, relay AR$^A$ will become deenergized, and will reverse the polarity of the current supplied to the associated track circuit. The resistance of the winding of relay AR$^A$ is such that when any one of the four circuits for this relay is closed, this relay will pick up its armature and close its front contacts.

Each signal lamp L, as shown in Fig. 4 is controlled by the associated approach lighting relay ALR and by the associated power-off relay POR in such a manner that when the associated approach lighting relay becomes energized, the lamp will be supplied with alternating current from the associated transformer T, or with direct current from the associated battery E, according as the associated power-off relay is then energized or deenergized. Referring to lamp L$^A$, for example, when approach lighting relay ALR$^A$ and power-off relay POR$^A$ are both energized, the circuit for this lamp may be traced from the left-hand terminal of transformer T$^A$ through front contact 46—46$^a$ of relay POR$^A$, wire 47, front contact 20—20$^a$ of relay ALR$^A$, wire 36, winding of relay LOR$^A$, wire 35, the filament of lamp L$^A$, and wires 42 and 43 to the right-hand terminal of secondary 41 of transformer T$^A$. When, however, approach lighting relay ALR$^A$ is energized and power-off relay POR$^A$ is deenergized, lamp L$^A$ is then lighted by virtue of a circuit which passes from terminal X of battery E$^A$ through wire 49, back contact 46—46$^b$ of relay POR$^A$, wire 47, front contact 20—20$^a$ of relay ALR$^A$, wire 36, winding of relay LOR$^A$, wire 35, the filament of lamp L$^A$, and wires 42 and 43 to terminal O of battery E$^A$.

It will be noted that each of the two energizing circuits for lamp L$^A$ includes the winding of relay LOR$^A$. This relay is so constructed that it will operate on either alternating or direct current, and its impedance is such that when either of the energizing circuits for lamp L$^A$ are closed, this relay will pick up its armature and close its front contact 33. It follows that if the filament of lamp L$^A$ should burn out when either of the circuits for this lamp are closed, relay LOR$^A$ will become deenergized, and if relay AR$^A$ is not already deenergized due to the presence of a train in block A—B, this latter relay will become deenergized and will reverse the polarity of the current supplied to the associated block. The operation, as a whole, of the apparatus shown in Fig. 4 is similar to that shown in Fig. 3, and it is thought that this operation will be readily understood from the foregoing description and from an inspection of the drawings without further detailed description.

Figure 5:
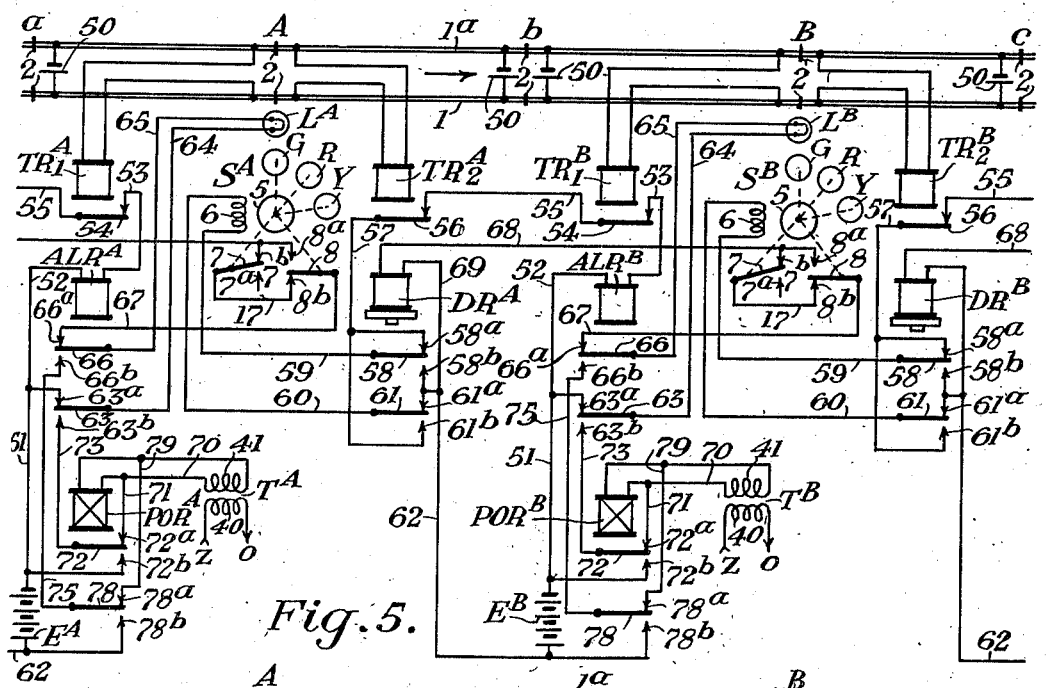

Referring now to Fig. 5, the rails 1 and 1$^a$ of the stretch of track here shown are divided into blocks in the same manner as in the preceding views, and each of these blocks is further subdivided to form track sections such as A—b and b—B. Although but two track sections are shown per block, it will be understood that more than two sections may be used, as determined by the length of the block, track conditions, and other factors. Each track section is provided with a track circuit comprising a battery 50 connected with the rails adjacent one end of the section and a neutral track relay connected with the rails adjacent the other end of the section, and designated by the reference character TR with a distinguishing exponent and subscript. Traffic entering each block is governed by a signal S having associated therewith an approach lighting relay designated by the reference character ALR with a distinguishing exponent, a distant relay designated by the reference character DR with a suitable distinguishing exponent, a battery designated by the reference character E with a distinguishing exponent, a power-off relay designated by the reference character POR with a distinguishing exponent, and a transformer designated by the reference character T with a distinguishing exponent.

The winding 6 of each signal, as here shown, is controlled by the two track relays for the corresponding block and also by the associated distant relay DR. Referring particularly to winding 6 of signal S$^A$, for example, this winding is provided with a normal energizing circuit which is closed when track relays TR$^A_2$ and TR$^B_1$ are both energized and distant relay DR$^A$ is also energized, and with a reverse energizing circuit which is closed when track relays TR$^A_2$ and TR$^B_1$ are both energized and distant relay DR$^A$ is deenergized. The normal energizing circuit for winding 6 of signal S$^A$ passes from battery E$^B$ through wires 51 and 52, winding of approach lighting relay ALR$^B$, wire 53, front contact 54 of track relay TR$^B_1$, wire 55, front contact 56 of track relay TR$^A_2$, wire 57, front contact 58—58$^a$ of distant relay DR$^A$, wire 59, winding 6 of signal S$^A$, wire 60, front contact 61—61$^a$ of distant relay DR$^A$, and wire 62 back to battery E$^B$. The reverse energizing circuit for winding 6 is similar to the normal energizing circuit just traced with the exception that this latter circuit includes back contacts 58—58$^b$ and 61—61$^b$ of distant relay DR$^A$ instead of front contacts 58—58$^a$ and 61—61$^a$ of distant relay DR$^A$. It follows that when block A—B is unoccupied so that track relays TR$^A_2$ and TR$^B_1$ are both energized, signal S$^A$ will occupy its proceed or caution position according as distant relay DR$^A$ is then energized or deenergized, respectively, and that when block A—B is occupied so that either track relay TR$^A_2$ or TR$^B_1$ is deenergized, signal S$^A$ will occupy its stop position.

It will be noted that both circuits for the winding 6 of each signal include the winding of the approach lighting relay ALR associated with the signal next in advance, and it follows therefore that each approach lighting relay will be energized or deenergized according as the block in the rear is unoccupied or is occupied.

Each distant relay DR is controlled by the signal next in advance and by the approach lighting relay ALR associated with said signal. Referring to relay DR$^A$, for example, one circuit for this relay is closed when signal S$^B$ indicates proceed and relay ALR$^B$ is energized. This circuit passes from battery E$^B$ through wire 51, front contact 63—63$^a$ of relay ALR$^B$, wire 64, the filament of lamp L$^B$, wire 65, front contact 66—66$^a$ of relay ALR$^B$, wire 67, contact 8—8$^b$ of signal S$^A$, wire 17, contact 7—7$^a$ of signal S$^A$, wire 68, winding of relay DR$^A$, and wires 69 and 62 back to battery E$^B$. Another circuit for relay DR$^A$ is closed when signal S$^B$ occupies its caution position and relay ALR$^B$ is energized. This latter circuit for relay DR$^A$ is similar to the circuit just traced with the exception that this latter circuit includes contact 8—8$^a$ of signal S$^B$ instead of contact 8—8$^b$ of signal S$^B$, wire 17, and contact 7—7$^a$ of signal S$^B$. It will be apparent, therefore, that distant relay DR$^A$ will be energized when section A—B is unoccupied, signal S$^B$ occupies its caution or proceed position, and filament of lamp L$^B$ is intact.

Each power-off relay POR is constantly connected with the secondary 41 of the associated transformer T, and the primary 40 of each transformer T is constantly connected with the terminals Z and O of a source of alternating current in the same manner as was previously described in connection with Fig. 4. It follows that each power-off relay will be energized except in the event of an interruption in the alternating current supply.

Each signal lamp L is controlled by the associated approach lighting relay ALR and by the associated power-off relay POR. Referring particularly to lamp L$^A$, for example, when relay ALR$^A$ is deenergized, and relay POR$^A$ is energized, lamp L$^A$ is supplied with alternating current over a circuit which may be traced from the left-hand terminal of transformer T$^A$, through wires 70 and 71, front contact 72—72$^a$ of relay POR$^A$, wire 73, back contact 63—63$^b$ of relay ALR$^A$, wire 64, the filament of lamp L$^A$, wire 65, back contact 66—66$^b$ of relay ALR$^A$, wire 75, front contact 78—78$^a$ of relay POR$^A$, and wire 79 to the right-hand terminal of the secondary 41 of transformer T$^A$. When, however, relay ALR$^A$ is deenergized and power-off relay POR$^A$ is also deenergized, lamp L$^A$ is then supplied with direct current from battery E$^A$ over a circuit which passes from battery E$^A$ through back contact 72—72$^b$ of power-off relay POR$^A$, wire 73, back contact 63—63$^b$ of approach lighting relay ALR$^A$, wire 64, the filament of lamp L$^A$, wire 65, back contact 66—66$^b$ of relay ALR$^A$, wire 75, and back contact 78—78$^b$ of relay POR$^A$ to battery E$^A$. It follows that each signal lamp is extinguished except when the associated approach lighting relay is deenergized. In explaining the operation as a whole of the system shown in Fig. 5, I will assume that a train occupies section a—A and that traffic conditions in advance are such that signals S^A and S^B both occupy their proceed positions. Under these conditions, track relay TR^A_1 will be deenergized due to the train shunt, and approach lighting relay ALR^A will therefore also be deenergized, so that lamp L^A will be lighted. Signal S^A will accordingly display a proceed indication. Signal S^B, however, will be dark.

When the train enters section A—b, track relay TR^A_2 will become deenergized and will interrupt the circuit which was previously closed for winding 6 of signal S^A, thus causing this signal to move to its stop position, and approach lighting relay ALR^B to become deenergized. The movement of signal S^A to its stop position will cause this signal to display a stop indication, since lamp L^A will then still be lighted, while the deenergization of approach lighting relay ALR^B will cause this latter relay to interrupt the circuit for distant relay DR^A and to complete one of the circuits for lamp L^B. When the circuit for lamp L^B becomes completed, this lamp will become lighted, and since signal S^B occupies its proceed position, this signal will then display a proceed indication.

When the train has completely passed out of section a—A, track relay TR^A_1 will pick up, and assuming there is no following train in the section next in rear of section a—A, one of the circuits for approach lighting relay ALR^A will then become completed at front contact 54 of track relay TR^A_1, with the result that approach lighting relay ALR^A will also pick up. When this happens, lamp L^A will become extinguished, since both circuits for this lamp will then be opened at the back contacts of relay ALR^A.

When the train enters section b—B, track relay TR^B_1 will become deenergized, but no change will occur in the remainder of the apparatus since the same circuits which were previously opened by the deenergization of track relay TR^A_2 will now be held open by the deenergization of track relay TR^B_1. When the train has completely entered section b—B, track relay TR^A_2 will pick up, but the picking up of this relay will not have any immediate effect on the remainder of the apparatus for obvious reasons.

As the train progresses into section B—c, the resultant deenergization of track relay TR^B_2 will cause signal S^B to move to its stop position, and distant relay DR^B to become deenergized in the same manner that the deenergization of track relay TR^A_2 caused signal S^A to move to its stop position, and relay DR^A to become deenergized when the train entered section A—b. When signal S^B moves to its stop position, all circuits for distant relay DR^A will be held open at the contacts controlled by this signal, and it follows that relay DR^A will remain deenergized as long as signal S^B remains in its stop position. When the train has passed completely out of section b—B, the resultant energization of track relay TR^B_1 will complete the reverse energizing circuit for winding 6 of signal S^A and this signal will then move to its caution position. Furthermore, since relay ALR^B is included in the reverse energizing circuit for winding 6 of signal S^A, when this circuit becomes closed, relay ALR^B will pick up and will deenergize signal lamp L^B, thus causing signal S^B to become dark. As the train progresses through the section to the right of section B—c no change in the apparatus will occur other than the picking up of track relay TR^B_2 and the dropping of the track relay for the section occupied by the train. When the train passes out of the section to the right of section B—c, signal S^B will move to its caution position in the same manner as signal S^A moved to its caution position when the train passed out of section b—B, and when this happens the resultant closing of contact 8—8^a of signal S^B will complete one of the circuits for distant relay DR^A, thus causing this relay to become energized. When this relay becomes energized, it will interrupt the reverse energizing circuit for winding 6 of signal S^A, and will complete the normal energizing circuit for winding of this signal, and signal S^A will then move to its proceed position. As the train continues to proceed beyond the point B, distant relay DR^B will finally pick up and cause signal S^B to move to its proceed position in a manner which will be obvious from the foregoing description. When signal S^B moves to its proceed position, all parts will be restored to the positions in which they are illustrated in the drawings.

If, when the parts are in the positions shown in Fig. 5, the filament of lamp L^B should become broken for any reason when the lamp is dark, the circuit for relay DR^A will then be interrupted at the filament of lamp L^B, and as a result, relay DR^A will become deenergized, and will complete the reverse energizing circuit for winding 6 of signal S^A, thus causing this signal to move to its caution position. It follows that with the apparatus constructed as shown in Fig. 5, if a signal lamp filament becomes broken when the lamp is dark, the signal next in the rear will move to its caution position, so that if a train approaches this signal, a caution indication will be displayed thereby. It will be seen, therefore, that with the apparatus constructed as shown in Fig. 5, the distant relays DR serve to check the continuity of the filament of the lamp for the signal next in advance while this lamp is dark.

Figure 6:
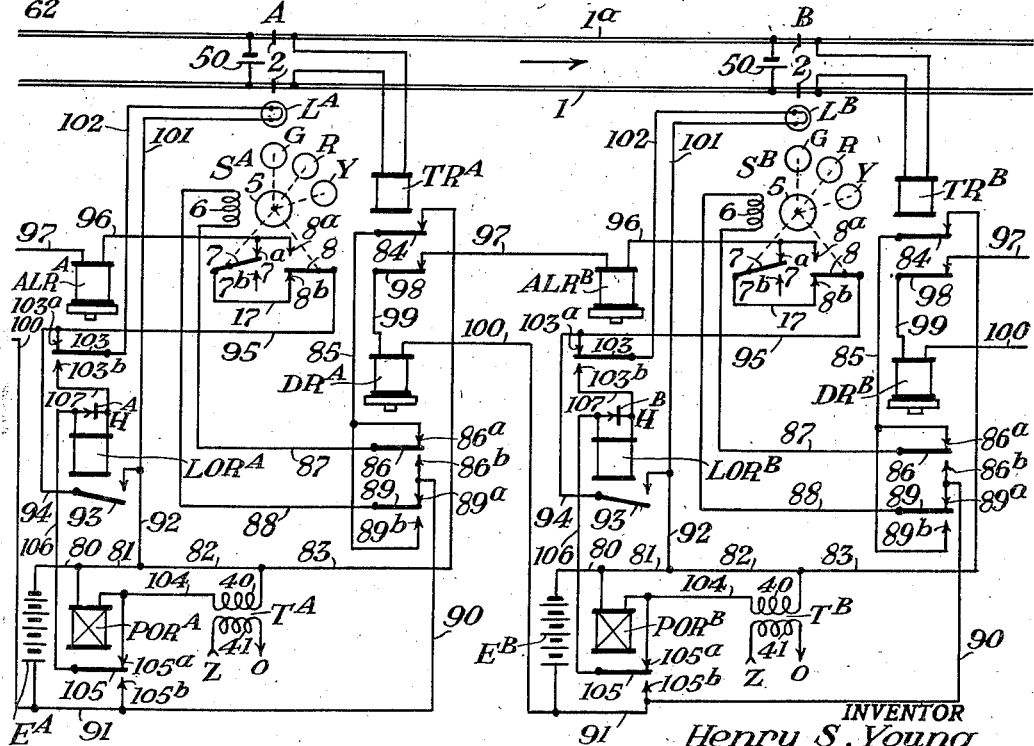

Referring next to Fig. 6, as here illustrated, the rails 1 and 1^a of the stretch of track shown in the drawings are divided into blocks in the same manner as in the preceding views, and each block is provided with a track circuit including a battery 50 connected with the rails at the exit end of the section, and a neutral track relay, designated by the reference character TR with a suitable distinguishing exponent, connected with the rails at the entrance end of the section. Traffic entering each block is governed by a signal S, which signal as here shown has associated therewith an approach lighting relay designated by the reference character ALR with a distinguishing exponent, a distant relay designated by the reference character DR with a distinguishing exponent, a light-out relay designated by the reference character LOR with a distinguishing exponent, a power-off relay designated by the reference character POR with a distinguishing exponent, a battery designated by the reference character E with a distinguishing exponent, and a transformer designated by the reference character T with a distinguishing exponent.

Each approach lighting relay, as here shown, is made sufficiently slow releasing so that its front contacts will remain closed during the interval of time required for the associated signal to move from its caution to its proceed position or vice versa.

The winding 6 of each signal S is controlled by the associated track relay TR and the associated distant relay DR. Referring particularly to winding 6 of signal $S^A$, this winding is provided with a normal energizing circuit which passes from battery $E^A$ through wires 80, 81, 82 and 83, front contact 84 of track relay $TR^A$, wire 85, front contact 86—86$^a$ of distant relay $DR^A$, wire 87, winding 6 of signal $S^A$, wire 88, front contact 89—89$^a$ of relay $DR^A$, and wires 90 and 91 back to battery $E^A$. This circuit is closed when and only when track relay $TR^A$ and distant relay $DR^A$ are both energized, and when this circuit is closed, winding 6 of signal $S^A$ is supplied with current of normal polarity, with the result that this signal then occupies its proceed position. Winding 6 of signal $S^A$ is also provided with a reverse energizing circuit which is similar to the normal energizing circuit just traced with the exception that this latter circuit includes back contacts 86—86$^b$ and 89—89$^b$ of distant relay $DR^A$ instead of front contacts 86—86$^a$ and 89—89$^a$ of relay $DR^A$. This latter circuit is closed when and only when track relay $TR^A$ is energized and distant relay $DR^A$ is deenergized, and when this circuit is closed winding 6 is supplied with current of reverse polarity, thus causing signal $S^A$ to occupy its caution position. When track relay $TR^A$ is deenergized, both the normal and reverse energizing circuits for signal $S^A$ are then open, and under these conditions signal $S^A$ occupies its stop position.

Each distant relay is controlled by the associated track relay $TR$ and by the circuit controller of the signal next in advance, as well as by the approach lighting and light-out relays associated with the signal next in advance. Referring particularly to relay $DR^A$ this relay is provided with a pickup circuit which passes from battery $E^B$ through wires 80, 81, and 92, front contact 93 of light-out relay $LOR^B$, wires 94 and 95, contact 8—8$^a$ of signal $S^B$, wire 96, winding of relay $ALR^B$, wire 97, front contact 98 of track relay $TR^A$, wire 99, winding of relay $DR^A$, and wire 100 back to battery $E^B$. Relay $DR^A$ is also provided with two holding circuits one of which is closed when track relay $TR^A$ and approach lighting relay $ALR^B$ are both energized, and signal $S^B$ occupies its proceed position, and the other of which is closed when track relay $TR^A$ and approach lighting relay $ALR^B$ are both energized and signal $S^B$ occupies its caution position. The holding circuit which is closed when signal $S^B$ occupies its proceed position passes from battery $E^B$ through wires 80, 81, 92 and 101, the filament of lamp $L^B$, wire 102, front contact 103—103$^a$ of relay $ALR^B$, wire 95, contact 8—8$^b$ of signal $S^B$, wire 17, contact 7—7$^a$ of signal $S^B$, wire 96, winding of relay $ALR^B$, wire 97, front contact 98 of track relay $TR^A$, wire 99, winding of relay $DR^A$, and wire 100 back to battery $E^B$. The holding circuit for relay $DR^A$ which is closed when signal $S^B$ occupies its caution position is similar to the circuit just traced with the exception that this latter circuit includes contact 8—8$^a$ of signal $S^B$ in place of contact 8—8$^b$ of signal $S^B$, wire 17 and contact 7—7$^a$ of signal $S^B$.

Each power-off relay $POR^B$ is controlled in the manner described in connection with Figs. 4 and 5, and this control will be apparent from the drawings without further description.

Each lamp $L$ is provided with a normal energizing circuit which is closed when the associated power-off relay is energized and the associated approach lighting relay $ALR$ is deenergized, and with an auxiliary energizing circuit which is closed when the associated power-off and light-out relays are both deenergized. Referring particularly to lamp $L^A$, the normal energizing circuit for this lamp may be traced from the left-hand terminal of the secondary 40 of transformer $T^A$, through wire 104, front contact 105—105$^a$ of power-off relay $POR^A$, wire 106, the winding of relay $LOR^A$, wire 107, back contact 103—103$^b$ of relay $ALR^A$, wire 102, the filament of lamp $L^A$, and wires 101, 92 and 82, to the right-hand terminal of secondary 40 of transformer $T^A$. The auxiliary energizing circuit for lamp $L^A$ passes from battery $E^A$ through wires 80, 81, 92 and 101, the filament of lamp $L^A$, wire 102, back contacts 103—103$^b$ of relay $ALR^A$, wire 107, the winding of relay $LOR^A$, wire 106, back contact 105—105$^b$ of power-off relay $POR^A$, and wire 91 to battery $E^A$.

It will be apparent that both circuits for the lamp include the winding of the light-out relay $LOR^A$, and that when the one circuit is closed, the lamp is supplied with alternating current, whereas when the other circuit is closed the lamp is supplied with direct current. It is desirable that each relay $LOR$ should pick up when either circuit for the associated lamp is closed, and each of these relays is accordingly so constructed that it will operate on either alternating or direct current.

It will also be apparent that the pickup circuit for relay $DR^A$, for example, is completed at front contact 93 of relay $LOR^B$, whereas both holding circuits for relay $DR^A$ are completed at front contact 103—103$^a$ of approach lighting relay $ALR^B$. It will further be noted that relay $LOR^B$ only becomes energized when relay $ALR^B$ becomes deenergized, and since relay $ALR^B$ is included in both circuits for relay $DR^A$, it follows that it is desirable that relay $LOR^B$ should hold its front contact closed when the pickup circuit for relay $DR^A$ becomes completed until after relay $ALR^B$ has picked up its armature and closed the holding circuit for this relay. To render relay $LOR^B$ sufficiently slow in releasing to accomplish this desirable result, a rectifier $H^B$ is shunted across the winding of relay $LOR^B$. Each of the other light-out relays has a rectifier shunted across the winding of the relay for a similar purpose.

As shown in Fig. 6, all parts are in their normal positions. That is to say, all relays but the two light-out relays are energized, signals $S^A$ and $S^B$ both occupy their proceed positions and lamps $L^A$ and $L^B$ are both extinguished.

When a train enters the block to the left of block A—B, approach lighting relay $ALR^A$ will become deenergized due to the deenergization of the track relay $TR$ for this block, and when relay $ALR^A$ becomes deenergized, one or the other of the circuits for lamp $L^A$ wil become closed according as power-off relay $POR^A$ is then energized or deenergized. The closing of one of the circuits for lamp $L^A$ will cause this lamp to become lighted, and since signal $S^A$ occupies its proceed position, this signal will then display a proceed indication. The closing of one of the circuits for lamp $L^A$ will also cause relay $LOR^A$ to pick up, but the picking up of this relay will have no immediate effect on the remainder of the apparatus.

When the train enters block A—B, track relay $TR^A$ will become deenergized and will interrupt all circuits for winding 6 of signal $S^A$, thus causing this signal to move to its stop positon. When signal $S^A$ moves to its stop position, the circuit for relay $ALR^A$ will then be open at the contacts controlled by signal $S^A$, and relay $ALR^A$ will, therefore, remain deenergized even after the train has completely entered block A—B and permitted the track relay for the block to the left of block A—B to pick up. The deenergization of track relay TR$^A$, in addition to causing signal S$^A$ to move to its stop position, will interrupt the circuit for relay DR$^A$, and this relay and approach lighting relay ALR$^B$ will therefore both become deenergized. The deenergization of relay DR$^A$ will have no immediate effect on the remainder of the apparatus, but the deenergization of approach lighting relay ALR$^B$ will cause lamp L$^B$ to become lighted, and light-out relay LOR$^B$ to become energized. When lamp L$^B$ becomes lighted, signal S$^B$ will display a proceed indication.

When the train enters the block to the right of block A—B, track relay TR$^B$ will become deenergized and will cause signal S$^B$ to move to its stop positon and distant relay DR$^B$ to become deenergized. When signal S$^B$ moves to its stop position, all circuits for relay DR$^A$ will then be open at the contacts controlled by this signal and relays DR$^A$ and ALR$^B$ will, therefore, remain deenergized as long as signal S$^B$ remains in its stop positon. When track relay TR$^A$ picks up due to the train having completely passed out of block A—B, the reverse energizing circuit for winding 6 of signal S$^A$ will become closed, and signal S$^A$ will then move to its caution position. The movement of signal S$^A$ to its caution position will complete one of the circuits in which relay ALR$^A$ is included, and relay ALR$^A$ will then pick up and will interrupt the circuit for lamp L$^A$, thus causing this lamp to become extinguished, and light-out relay LOR$^A$ to become deenergized.

When the train leaves the block to the right of block A—B, track relay TR$^B$ will pick up but relay DR$^B$ will remain deenergized. Signal S$^B$ will therefore move to its caution position so that it will then display a caution indication. The movement of signal S$^B$ to its caution position will complete the pickup circuit for relay DR$^A$, and this relay and relay ALR$^B$ will then both pick up. When relay DR$^A$ picks up, it will complete the normal energizing circuit for winding 6 of signal S$^A$, and signal S$^A$ will then move to its proceed position. The pickup up of relay ALR$^B$ will interrupt the circuit for lamp L$^B$, and this lamp will then become extinguished and light-out relay LOR$^B$ will become deenergized. The deenergization of relay LOR$^B$ will tend to interrupt the pickup circuit for relay DR$^A$, but due to the presence of rectifier H$^B$ across the winding of relay LOR$^B$, this relay will not open its front contact 93 until after relay ALR$^B$ has closed its front contact 103—103$^a$, and when front contact 103—103$^a$ of relay ALR$^B$ becomes closed, one of the holding circuits for relay DR$^A$ will then be closed, with the result that relays DR$^A$ and ALR$^B$ will both remain continuously energized under these conditions. When the train has proceeded far enough in advance of block A—B, relay DR$^B$ will pick up and will complete the normal energizing circuit for signal S$^B$, thus causing this signal to move to its proceed position.

If, with the parts in the position shown in Fig. 6, the filament of lamp L$^B$, for example, should become broken for any reason when the lamp is extinguished, the circuit which was previously closed for relay DR$^A$ will become interrupted, and relay DR$^A$ will then become deenergized, and will reverse the polarity of the current supplied to winding 6 of signal S$^A$, so that this signal will move to its caution position. As a result, when a train subsequently enters the block to the left of block A—B, and causes lamp L$^A$ to become lighted, signal S$^A$ will display a caution instead of a proceed indication, thus eliminating the undesirable condition of having an engineman pass signal S$^A$ when this signal is displaying a proceed indication and finding the signal S$^B$ dark.

It will be apparent, therefore, that with a signaling system constructed as shown in Fig. 6, the burning out of a signal lamp when the signal in the rear thereof occupies its proceed position will cause the signal in the rear to immediately move to its caution position.

Figure 7:
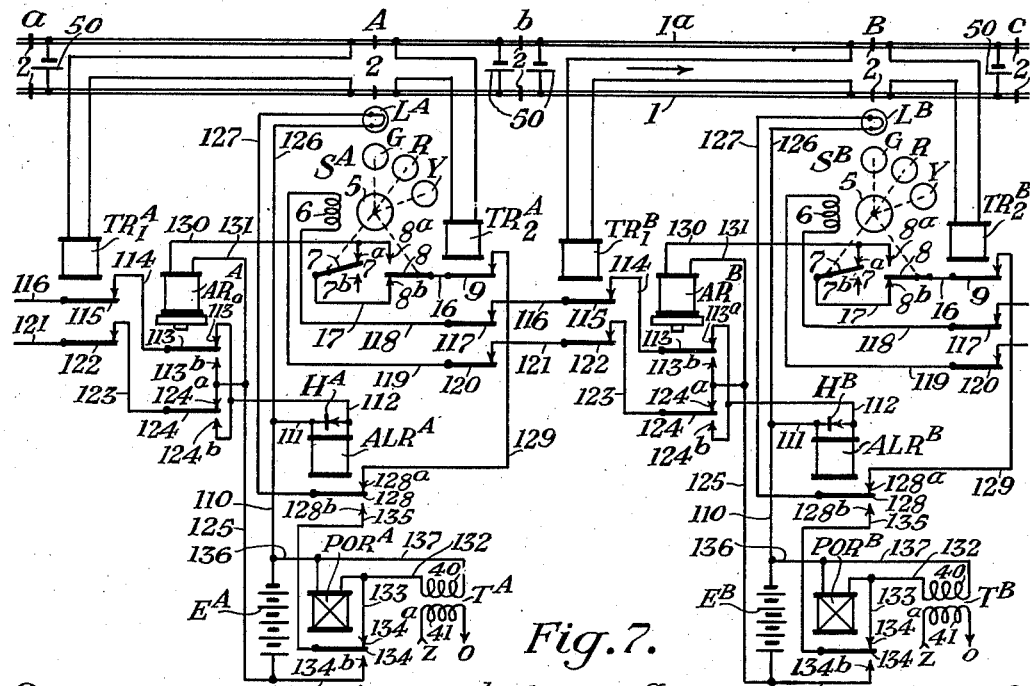

Referring now to Fig. 7, the track circuits and signals shown in this view are the same as in Fig. 5, but in Fig. 7 the winding 6 of each signal is controlled by the two track relays TR for the associated block and by the auxiliary relay associated with the signal next in advance, through the medium of a polarized line circuit which includes the winding of the approach lighting relay for the signal next in advance. Referring to signal S$^A$, for example, when track relays TR$^A_2$ and TR$^B_1$ are both energized and relay AR$^B$ is also energized, the polarized line circuit for winding 6 of signal S$^A$ is closed and, under these conditions, winding 6 is supplied with current of normal polarity, the path of the current being from battery E$^B$, through wires 110 and 111, the winding of relay ALR$^B$, wire 112, front contact 113—113$^a$ of relay AR$^B$, wire 114, front contact 115 of track relay TR$^B_1$, line wire 116, front contact 117 of track relay TR$^A_2$, wire 118, winding 6 of signal S$^A$, wire 119, front contact 120 of track relay TR$^A_2$, line wire 121, front contact 122 of track relay TR$^B_1$, wire 123, front contact 124—124$^a$ of relay AR$^B$, and wire 125 back to battery E$^B$. When track relays TR$^A_2$ and TR$^B_1$ are both energized and auxiliary relay AR$^B$ is deenergized, the polarized line circuit for winding 6 of signal S$^A$ is again closed but, under these conditions, due to the fact that the pole-changing contacts of relay AR$^B$ are now reversed, winding 6 is supplied with current of reverse polarity over this circuit.

It should be pointed out that since the approach lighting relay associated with each signal is included in the circuit for the winding 6 of the signal in the rear, and since this circuit includes front contacts of the two track relays for the two track sections next in rear of the associated signal, the approach lighting relay for each signal will be energized except when the block in the rear of such signal is occupied by a train.

For reasons which will be apparent from an inspection of the drawings, it is desirable that each approach lighting relay should hold its front contacts closed during the interval of time between the opening of the back contacts and the closing of the front contacts of the associated auxiliary relay AR, and to accomplish this result, each approach lighting relay has a rectifier designated by the reference character H with a suitable distinguishing exponent shunted across its winding.

Each auxiliary relay is controlled by the circuit controller of the associated signal, by the track relay for the first track section in advance of the associated signal, and by the associated approach lighting relay. Referring particularly to relay AR$^A$, for example, this relay is provided with one circuit which is closed when track relay TR$^A_2$ and approach lighting relay ALR$^A$ are both energized and signal S$^A$ occupies its proceed position, this circuit passing from battery E$^A$, through wires 110 and 126, the filament of lamp L^A, wire 127, front contact 128—128^a of relay ALR^A, wire 129, front contact 9 of track relay TR^A_2, wire 16, contact 8—8^b of signal S^A, wire 17, contact 7—7^a of signal S^A, wire 130, the winding of relay AR^A, and wires 131 and 125 back to battery E^A. Relay AR^A is also provided with another circuit which is closed when track relay TR^A_2 and relay ALR^A are both energized and signal S^A occupies its caution position, that latter circuit being similar to the circuit just traced with the exception that this circuit includes contact 8—8^a of signal S^A in place of contact 8—8^b of signal S^A, wire 17, and contact 7—7^a of signal S^A.

It will be noted that both circuits for each auxiliary relay include the filament of the lamp of the associated signal, and it follows that if the filament of this lamp becomes broken, when either of these circuits is closed, the associated auxiliary relay will become deenergized. The resistance of each auxiliary relay is such that when either circuit for this relay is closed, the associated lamp will remain extinguished.

Associated with each signal are a power-off relay POR and a transformer T connected and arranged in the manner previously described in connection with Fig. 5.

Each signal lamp L is controlled by the associated approach lighting relay ALR and by the associated power-off relay POR. Referring particularly to lamp L^A when relay ALR^A is deenergized and relay POR^A is energized, lamp L^A is then energized by alternating current over a circuit which may be traced from the left-hand terminal of secondary 40 of transformer T^A, through wires 132 and 133, front contact 134—134^a of power-off relay POR^A, wire 135, back contact 128—128^b of relay ALR^A, wire 127, the filament of lamp L^A, and wires 126, 110, 136 and 137 to the right-hand terminal of secondary 40 of transformer T^A. When, however, relay ALR^A is deenergized, and power-off relay POR^A is also deenergized, lamp L^A is then energized by direct current over a circuit which may be traced from battery E^A through wires 119 and 126, the filament of lamp L^A, wire 127, back contact 128—128^b of relay ALR^A, wire 135, back contact 134—134^b of power-off relay POR^A, and wire 138 back to battery E^A.

In explaining the operation as a whole of the apparatus shown in Fig. 7, I will assume that section a—A is occupied by a train, and that traffic conditions in advance are such that signals S^A and S^B both occupy their proceed positions. With section a—A occupied, track relay TR^A_1 will be deenergized and the circuit for approach lighting relay ALR^A will therefore be interrupted at the front contacts 115 and 122 of track relay TR^A_2 so that relay ALR^A will also be deenergized. Since relay ALR^A is deenergized, the circuit for relay AR^A will be interrupted at front contact 128—128^a of relay ALR^A and one of the energizing circuits for lamp L^A will be closed at back contact 128—128^b of relay ALR^A. Relay AR^A will therefore be deenergized and lamp L^A will be lighted. Since lamp L^A is lighted, and signal S^A occupies its proceed position, this signal will display a proceed indication.

When the train enters section A—b, track relay TR^A_2 will become deenergized and will interrupt all circuits for winding 6 of signal S^A, thus causing this signal to move to its stop position, and approach lighting relay ALR^B to become deenergized. The deenergization of approach lighting relay ALR^B will interrupt the circuit which was previously closed for auxiliary relay AR^B, and this relay will now also become deenergized. The deenergization of this relay, however, under these conditions, will have no immediate effect on the remainder of the apparatus. The deenergization of approach lighting relay ALR^B will also cause one of the circuits for lamp L^B to become completed, and this lamp will therefore become lighted, thus causing signal S^B to display a proceed indication. When the train passes completely out of section a—A, track relay TR^A_1 will pick up, and when this relay picks up under these conditions, one of the circuits for the winding 6 of the signal for the associated block will become completed which will cause relay ALR^A to become energized. When the train enters section b—B, track relay TR^B_1 will become deenergized but since all circuits controlled by this relay were previously opened at contacts 117 and 120 of track relay TR^A_2, the deenergization of relay TR^B_1 will have no immediate effect on the remainder of the apparatus. When the train has passed completely out of section A—b, track relay TR^A_2 will pick up, but the picking up of this relay will also have no immediate effect on the remainder of the apparatus.

When the train enters section B—c, track relay TR^B_2 will become deenergized and will deenergize winding 6 of signal S^B, thus causing this signal to move to its stop position. When the train has completely entered section B—c, track relay TR^B_1 will pick up, and will complete the reverse energizing circuit for winding 6 of signal S^A, thus causing this signal to move to its caution position, and approach lighting relay ALR^B to pick up. When the signal reaches its caution position, the resultant closing of contact 8—8^a of this signal will complete one of the circuits for relay AR^A, thus causing this relay to become energized. When this relay becomes energized, the circuit for relay ALR^A will be momentarily interrupted, but due to the rectifier H^A, this relay will not open its front contact 128—128^a under these conditions. The picking up of approach lighting relay ALR^B will interrupt the circuit for lamp L^B which was previously closed at back contact 128—128^b of relay ALR^B and lamp L^B will become extinguished. When the train leaves section B—c, track relay TR^B_2 will pick up, but this will not have any effect on the remainder of the apparatus until after the train has passed completely out of the block to the right of point B, at which time signal S^B will become energized in its reverse direction, and will move to its caution position in the same manner that signal S^A became energized in its reverse direction and moved to its caution position when the train passed out of block A—B. When signal S^B moves to its caution position, one of the circuits for relay AR^B will become completed, and this relay will then pick up and will reverse the polarity of the current supplied to winding 6 of signal S^A, thus causing this signal to move to its proceed position. When the train has passed completely out of the second block in advance of block A—B, winding 6 of signal S^B will become energized in its normal direction and signal S^B will then move to its proceed position. When signal S^B reaches its proceed position, all parts will then be restored to the positions in which they are shown in the drawings.

I will now assume that with the parts in the positions shown in Fig. 7, the filament of lamp L^B becomes interrupted. Under these conditions, the circuit which was previously closed for relay AR$^B$ will be interrupted at the lamp filament and relay AR$^B$ will, therefore, become deenergized, and will reverse the polarity of the current supplied to winding 6 of signal S$^A$, thus causing this signal to move from its proceed to its caution position. As a result, if a train subsequently approaches signal S$^A$, this signal will display a caution indication instead of a proceed indication, and the engineman will, therefore, be prepared to stop when he reaches signal S$^B$.

Figure 8:
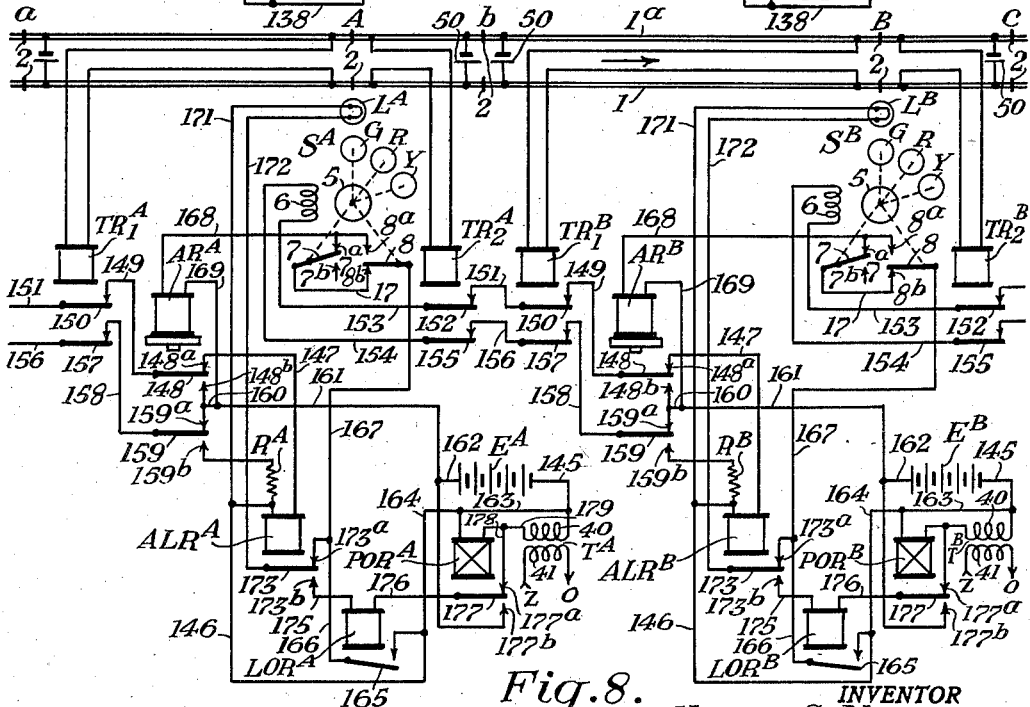
Figure 6:
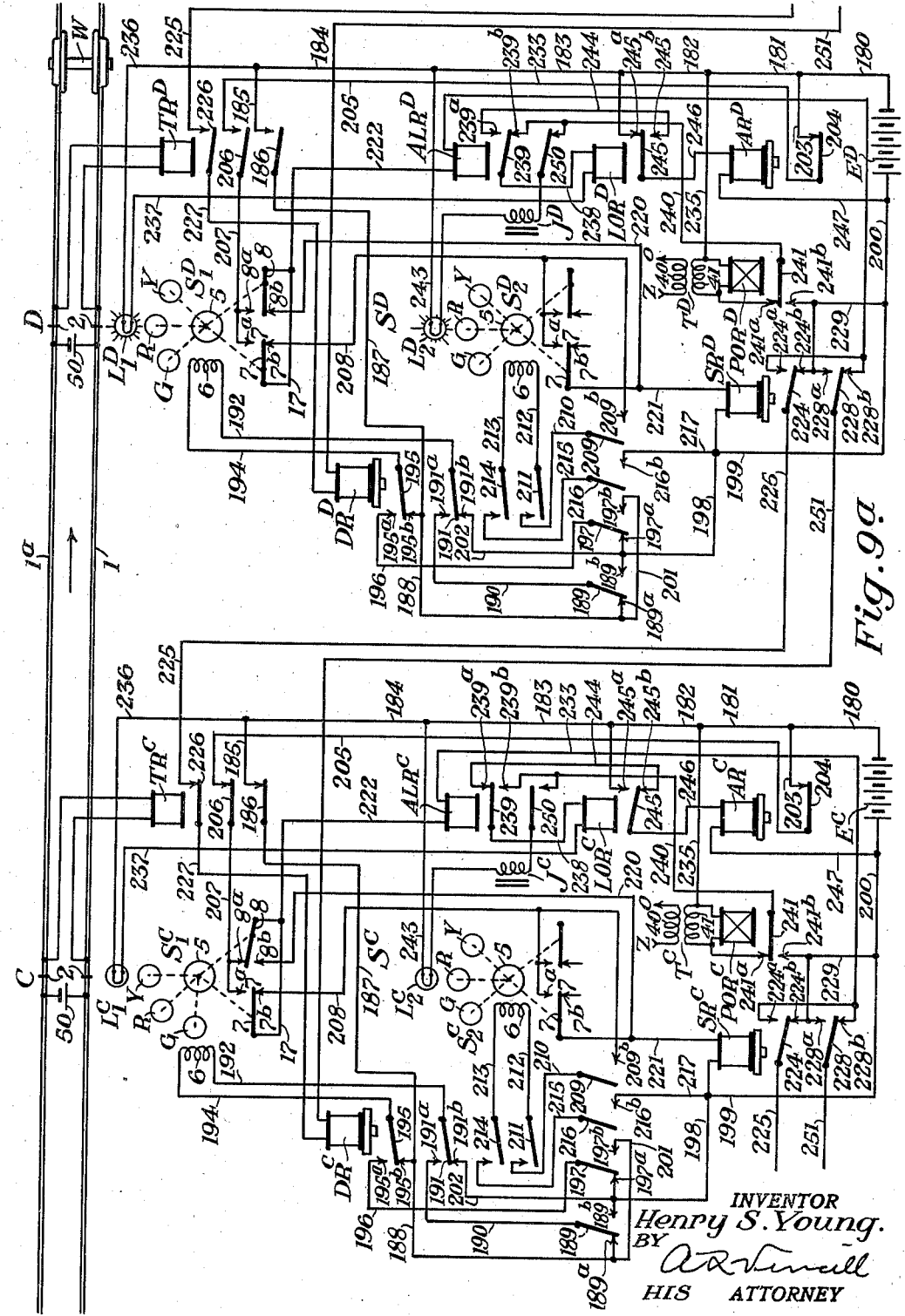

Referring now to Fig. 8, as here shown, the track circuits and signals are the same as in Fig. 7, but in Fig. 8, each signal has associated therewith, in addition to the apparatus shown in Fig. 7, a light-out relay designated by the reference character LOR with a suitable distinguishing exponent. Furthermore, as shown in Fig. 8, the circuits are so arranged that each signal is lighted as long as the associated block is occupied.

Referring to signal S$^A$, for example, one circuit for winding 6 of this signal is closed when track relays TR$^A$$_2$ and TR$^B$$_1$ are both energized, and relay AR$^B$ is energized, and this circuit passes from battery E$^B$, through wires 145, 163, 164 and 146, the winding of relay ALR$^B$, wire 147, front contact 148—148$^a$ of relay AR$^B$, wire 149, front contact 150 of track relay TR$^B$$_1$, line wire 151, front contact 152 of track relay TR$^A$$_2$, wire 153, winding 6 of signal S$^A$, wire 154, front contact 155 of track relay TR$^A$$_2$, wire 156, front contact 157 of track relay TR$^B$$_1$, wire 158, front contact 159—159$^a$ of relay AR$^B$, and wires 160, 161 and 162 back to battery E$^B$. When this circuit is closed, winding 6 of signal S$^A$ is supplied with current of normal polarity and, under these conditions, signal S$^A$ will occupy its proceed position. Another circuit for winding 6 of signal S$^A$ is closed when track relays TR$^A$$_2$ and TR$^B$$_1$ are both energized, and relay AR$^B$ is deenergized, and passes from battery E$^B$, through wires 145, 163, 164 and 146, a resistance R$^B$, back contact 159—159$^b$ of relay AR$^B$, wire 158, front contact 157 of track relay TR$^B$$_1$, wire 156, front contact 155 of track relay TR$^A$$_2$, wire 154, winding 6 of signal S$^A$, wire 153, front contact 152 of track relay TR$^A$$_2$, line wire 151, front contact 150 of track relay TR$^B$$_1$, wire 149, back contact 148—148$^b$ of relay AR$^B$, and wires 160, 161 and 162 back to battery E$^B$. When this latter circuit is closed, the winding 6 of signal S$^A$ is supplied with current of reverse polarity, and, under these conditions, signal S$^A$ occupies its caution position.

It will be noted that approach lighting relay ALR$^B$ is included in the circuit first traced for winding 6 of signal S$^A$, and it follows that this relay will be energized whenever signal S$^A$ occupies its proceed position. It will also be noted that the other circuit for winding 6 of signal S$^A$ does not include the winding of relay ALR$^B$, but does include resistor R$^B$. The resistance of the resistor R$^B$ is the same as that of the winding of relay ALR$^B$, and the function of this resistor is to maintain the resistance of both circuits for winding 6 of signal S$^A$ at the same value, so that when either one of these circuits is closed, winding 6 will be supplied with current of the same magnitude.

Each auxiliary relay AR is provided with two circuits which are controlled by the associated signal S and by the associated light-out relay LOR, and with two other circuits which are controlled by the associated signal S and by the associated approach lighting relay ALR. Referring to relay AR$^A$, for example, one circuit for this relay is closed when the signal S$^A$ occupies its proceed position and light-out relay LOR$^A$ is energized, and may be traced from battery E$^A$ through wires 145, 163 and 164, front contact 165 of relay LOR$^A$, wires 166 and 167, contact 8—8$^b$ of signal S$^A$, wire 17, contact 7—7$^a$ of signal S$^A$, wire 168, winding of relay AR$^A$, and wires 169, 161 and 162 back to battery E$^A$. Another circuit for relay AR$^A$ is closed when signal S$^A$ occupies its caution position and relay LOR$^A$ is energized, and is similar to the circuit just traced with the exception that this latter circuit includes contact 8—8$^a$ of signal S$^A$ in place of contact 8—8$^b$ of signal S$^A$, wire 17 and contact 7—7$^a$ of signal S$^A$. A third circuit for this relay is closed when signal S$^A$ occupies its proceed position and relay ALR$^A$ is energized, and passes from battery E$^A$, through wires 145, 163, 164, 146 and 171, the filament of lamp L$^A$, wire 172, front contact 173—173$^a$ of relay ALR$^A$, wire 167, contact 8—8$^b$ of signal S$^A$, wire 17, contact 7—7$^a$ of signal S$^A$, wire 168, winding of relay AR$^A$ and wires 169, 161 and 162 back to battery E$^A$. A fourth circuit for relay AR$^A$ is closed when signal S$^A$ occupies its caution position and relay ALR$^A$ is energized, and is similar to the circuit just traced with the exception that this latter circuit includes contact 8—8$^a$ of signal S$^A$ in place of contact 8—8$^b$ of signal S$^A$, wire 17, and contact 7—7$^a$ of signal S$^A$.

Each signal lamp L is controlled by the associated approach lighting relay and the associated power-off relay. Referring particularly to lamp L$^A$, for example, when approach lighting relay ALR$^A$ is deenergized and power-off relay POR$^A$ is energized, lamp L$^A$ is lighted by virtue of an energizing circuit which may be traced from the right-hand terminal of transformer T$^A$ through wires 163, 164, 146 and 171, the filament of lamp L$^A$, wire 172, back contact 173—173$^b$ of relay ALR$^A$, wire 175, winding of relay LOR$^A$, wire 176, front contact 177—177$^a$ of power-off relay POR$^A$, and wires 178 and 179 to the left-hand terminal of secondary winding 40 of transformer T$^A$. When, however, approach lighting relay ALR$^A$ is deenergized and power-off relay POR$^A$ is also deenergized, lamp L$^A$ is then lighted by virtue of another energizing circuit which may be traced from battery E$^A$, through wires 145, 163, 164, 146 and 171, the filament of lamp L$^A$, wire 172, back contact 173—173$^b$ of approach lighting relay ALR$^A$, wire 175, winding of light-out relay LOR$^A$, wire 176, back contact 177—177$^b$ of power-off relay POR$^A$, and wire 162 back to battery E$^A$.

It will be noted that the light-out relay LOR$^A$ is included in both energizing circuits for lamp L$^A$, and that one of these circuits is energized by alternating current, whereas the other circuit is energized by direct current. Relay LOR$^A$ is designed to operate on either alternating or direct current, and the parts of the relay are so proportioned that when either one of the energizing circuits for lamp L$^A$ are closed, this relay will pick up its armature and close its front contact.

In explaining the operation as a whole of the system shown in Fig. 8, I will assume that a train occupies section a—A, and that traffic conditions in advance are such that signals S$^A$ and S$^B$ both occupy their proceed positions. Under these conditions, track relay TR$^A$$_1$ will be deenergized due to the train shunt, and approach lighting relay ALR$^A$ will therefore also be deenergized, so that lamp L$^A$ will be lighted and light-out relay LOR$^A$ will be energized. Signal S$^A$ will therefore display a proceed indication. Furthermore, relay AR$^A$ will be held energized by virtue of the circuit for this relay including front contact 165 of light-out relay LOR$^A$.

When the train enters section A—b, track relay TR$^A_2$ will become deenergized and will interrupt both circuits for winding 6 of signal S$^A$, thus causing this signal to move to its stop position, and causing approach lighting relay ALR$^B$ and relay AR$^A$ to become deenergized. The movement of signal S$^A$ to its stop position will cause this signal to display a stop indication, since lamp L$^A$ is then lighted; while the deenergization of approach lighting relay ALR$^B$ will interrupt the circuit which was previously closed for relay AR$^B$ and will complete one of the circuits for lamp L$^B$. When the circuit for lamp L$^B$ becomes completed, this lamp will become lighted, thus causing signal S$^B$ to display a proceed indication. Furthermore, relay LOR$^B$ will pick up and will complete another circuit for relay AR$^B$, thus causing this relay to remain energized. It should be pointed out that relay AR$^B$ is sufficiently slow releasing so that it will not open its front contacts between the opening of the one circuit for this relay at front contact 173—173$^a$ of relay ALR$^B$ and the closing of the other circuit for this relay at front contact 165 of relay LOR$^B$.

When the train has passed completely out of section a—A, track relay TR$^A_1$ will pick up, but approach lighting relay ALR$^A$ will remain deenergized since the circuit in which this relay is included will then still be open at front contact 148—148$^a$ and 159—159$^a$ of relay AR$^A$. It will be seen, therefore, that lamp L$^A$ will remain lighted, thus causing signal S$^A$ to continue to display a stop indication even though the train is now past this signal.

When the train enters section b—B, track relay TR$^B_1$ will become deenergized, but no change will occur in the indication of signal S$^A$ since the circuits for this signal which were previously opened by the deenergization of track relay TR$^A_2$ are now held open by the deenergization of track relay TR$^B_1$. When the train has completely entered section b—B, track relay TR$^A_2$ will pick up, but the picking up of this relay will have no immediate effect on the apparatus for obvious reasons.

As the train progresses into section B—c, the resultant deenergization of track relay TR$^B_2$ will cause signal S$^B$ to move to its stop position, and when this signal moves to its stop position, relay AR$^B$ will become deenergized and will open the circuit for winding 6 of signal S$^A$ including the winding of approach lighting relay ALR$^B$, at front contacts 148—148$^a$ and 159—159$^a$ of this relay. When the train has completely entered section B—c, track relay TR$^B_1$ will pick up and will complete the reverse energizing circuit for winding 6 of signal S$^A$, thus causing this signal to move to its caution position. When signal S$^A$ moves to its caution position, the circuit for auxiliary relay AR$^A$ including contact 8—8$^a$ of signal S$^A$ and front contact 165 of light-out relay LOR$^A$ will become completed, and relay AR$^A$ will therefore pick up. When this relay picks up, the circuit in which approach lighting relay ALR$^A$ is included will become completed and relay ALR$^A$ will then pick up, thus interrupting the circuit which was previously closed for lamp L$^A$, and hence causing light-out relay LOR$^A$ to become deenergized.

As the train continues to proceed beyond signal S$^B$, no further change in the apparatus will take place until the train has passed completely out of the block to the right of block A—B at which time winding 6 of signal S$^B$ will become energized in the reverse direction, and will cause signal S$^B$ to move to its caution position. When signal S$^B$ reaches its caution position, relay AR$^B$ will become energized in the same manner that relay AR$^A$ became energized when signal S$^A$ moved to its caution position; and the energization of relay AR$^B$, in turn, will complete the normal energizing circuit for winding 6 of signal S$^A$, thus causing signal S$^A$ to move to its proceed position, and approach lighting relay ALR$^B$ to become energized. When signal S$^A$ moves from its caution position to its proceed position, the circuit for relay AR$^A$ which was previously closed at front contact 8—8$^a$ of signal S$^A$ will become interrupted and another circuit for this relay will become closed at contacts 8—8$^b$ and 7—7$^a$ of signal S$^A$. Relay AR$^A$, however, is sufficiently slow releasing so that it will not open its front contacts under these conditions. The energization of approach lighting relay ALR$^B$ will interrupt the circuit which was previously closed for lamp L$^B$, thus causing lamp L$^B$ to become extinguished and light-out relay LOR$^B$ to become deenergized. When light-out relay LOR$^B$ becomes deenergized, the circuit for relay AR$^B$ which was previously closed at front contact 165 of this relay will become interrupted, but relay AR$^B$ will remain energized because another circuit for this relay will then be closed at front contact 173—173$^a$ of approach lighting relay ALR$^B$. As the train continues to progress beyond the signal S$^B$, winding 6 of this signal will finally become energized in the normal direction and cause signal S$^B$ to move to its proceed position. As the signal moves to its proceed position, the circuit which was previously closed for relay AR$^B$ at contact 8—8$^a$ of signal S$^B$ will become interrupted and another circuit for this relay will become closed at contacts 8—8$^b$ and 7—7$^a$ of signal S$^B$. Relay AR$^B$, however, maintains its front contacts closed, under these conditions, due to its slow releasing characteristics. With signal S$^B$ restored to its proceed position, all parts are restored to the positions in which they are shown in the drawings.

If, with the apparatus constructed as shown in Fig. 8, the filament of lamp L$^B$ should become broken or interrupted for any reason while the lamp is extinguished, the circuit for relay AR$^B$ will become interrupted at the filament of the lamp, and this relay will therefore open its front contacts and close its back contacts, thus reversing the polarity of the current supplied to winding 6 of signal S$^A$, and hence causing this signal to move to its caution position. A similar operation will occur if the filament of the lamp associated with any of the other signals becomes broken under like conditions.

Referring now to Figs. 9 and 9$^a$, the track rails 1 and 1$^a$, as here illustrated, are divided into blocks in the same manner as in the preceding views, three of these blocks A—B, B—C and C—D being shown complete in the drawings. Each of these blocks comprises a single track section, and each track section is provided with a track circuit including a battery 50 and a track relay TR. Located at the entrance end of each section is a signal S which, as here shown, comprises two signal mechanisms, each designated by the same reference character as the reference character for the associated signal with a distinguishing subscript. Each of these signal mechanisms is similar in all respects to the mechanism of the signals previously described, and in actual practice both mechanisms will usually be secured to the same pole or mast with the one mechanism disposed above the other mechanism. With this arrangement, when both mechanisms are displaying a red aspect, the signal indicates "stop"; when the upper mechanism displays a yellow aspect and the lower mechanism displays a red aspect, the signal indicates "caution"; when the upper mechanism displays a yellow aspect and the lower mechanism displays a green aspect, the signal indicates approach restricting; and when the upper mechanism displays a green aspect and the lower mechanism a red aspect, the signal indicates "proceed".

Associated with each signal are a polarized distant relay DR, an approach lighting relay ALR, an auxiliary relay AR, a reactor J, a signal repeater relay SR, a light-out relay LOR, a power-off relay POR, a transformer T, and a battery E. Each reactor J has the same reactance as the associated light-out relay LOR.

The winding 6 of each signal mechanism $S_1$ is controlled by the associated track relay TR and by the associated distant relay DR. Referring particularly to the winding 6 of signal mechanism $S^A_1$, when track relay $TR^A$ is energized and distant relay $DR^A$ is energized in its normal direction so that its polar contacts are swung toward the left, as shown in the drawings, this winding is supplied with current of normal polarity over a circuit which passes from battery $E^A$, through wires 180, 181, 182, 183, 184 and 185, front contact 186 of track relay $TR^A$, wires 187 and 188, polar contact 189—189a of relay $DR^A$, wire 190, front contact 191—191a of relay $DR^A$, wire 192, winding 6 of signal mechanism $S^A_1$, wire 194, front contact 195—195a of relay $DR^A$, wire 196, polar contact 197—197a of relay $DR^A$, and wires 198, 199 and 200 back to battery $E^A$. When, however, track relay $TR^A$ is energized and distant relay $DR^A$ is energized in its reverse direction so that its polar contacts are swung toward the right, winding 6 of signal mechanism $S^A_1$ is then supplied with current of reverse polarity over a circuit which passes from battery $E^A$, through wires 180, 181, 182, 183, 184 and 185, front contact 186 of track relay $TR^A$, wires 187, 188 and 201, polar contact 197—197b of relay $DR^A$, wire 196, front contact 195—195a of relay $DR^A$, wire 194, winding 6 of signal mechanism $S^A_1$, wire 192, front contact 191—191a of distant relay $DR^A$, wire 190, polar contact 189—189b of distant relay $DR^A$, and wires 198, 199 and 200 back to battery $E^A$. When track relay $TR^A$ is energized and distant relay $DR^A$ is deenergized, winding 6 of signal mechanism $S^A_1$ is then supplied with current of reverse polarity over a circuit which passes from battery $E^A$, through wires 180, 181, 182, 183, 184 and 185, front contact 186 of track relay $TR^A$, wire 187, back contact 195—195b of distant relay $DR^A$, wire 194, winding 6 of signal mechanism $S^A_1$, wire 192, back contact 191—191b of distant relay $DR^A$, and wires 202, 198, 199 and 200 back to battery $E^A$. When winding 6 of signal mechanism $S^A_1$ is supplied with current of normal polarity, this signal mechanism will, of course, occupy the position in which the green roundel is disposed in front of the associated lamp L, and when winding 6 of this signal mechanism is supplied with current of reverse polarity, this signal mechanism will occupy the position in which the yellow roundel is disposed in front of the associated lamp L.

The winding 6 of each signal mechanism $S_2$ is controlled by the associated distant relay DR, by the associated signal mechanism $S_1$, by the associated track relay TR, and by the associated auxiliary relay AR. Referring particularly to winding 6 of signal mechanism $S^A_2$, the circuit for this winding passes from battery $E^A$, through wires 180 and 203, front contact 204 of auxiliary relay $AR^A$, wire 205, front contact 206 of track relay $TR^A$, wire 207, contact 8—8a of signal mechanism $S^A_1$, wire 17, contact 7—7b of signal mechanism $S^A_1$, wire 208, polar contact 209—209b of distant relay $DR^A$, wire 210, front contact 211 of distant relay $DR^A$, wire 212, winding 6 of signal mechanism $S^A_2$, wire 213, front contact 214 of distant relay $DR^A$, wire 215, polar contact 216—216b of distant relay $DR^A$, and wires 217, 199 and 200 back to battery $E^A$. This circuit is closed only when track section A—B is unoccupied and signal mechanism $S^A_1$ is swung to its left-hand extreme position, and the current supplied to winding 6 of signal mechanism $S^A_2$ over this circuit is of such polarity that when this circuit is closed, the signal mechanism will be swung to the position in which the green roundel is disposed in front of the associated lamp.

Each signal repeater relay SR is controlled by the associated signal mechanisms $S_1$ and $S_2$, by the associated track relay TR and by the associated auxiliary relay AR. Referring particularly to relay $SR^A$, one circuit for this relay is closed when auxiliary relay $AR^A$ and track relay $TR^A$ are both energized, and the signal mechanisms $S^A_1$ and $S^A_2$ of signal $S^A$ occupy their proceed positions, and passes from battery $E^A$, through wires 180 and 203, front contact 204 of auxiliary relay $AR^A$, wire 205, front contact 206 of track relay $TR^A$, wire 207, contact 7—7a of signal mechanism $S^A_1$, wire 17, contact 8—8b of signal mechanism $S^A_1$, wires 220 and 221, winding of relay $SR^A$, and wires 199 and 200 back to battery $E^A$. Another circuit for relay $SR^A$ is closed when track relay $TR^A$ and auxiliary relay $AR^A$ are both energized and signal mechanisms $S^A_1$ and $S^A_2$ occupy the positions in which the yellow and green roundels of these signal mechanisms are disposed respectively in front of the associated lamps $L^A_1$ and $L^A_2$, this latter circuit passing from battery $E^A$ through wires 180 and 203, front contact 204 of auxiliary relay $AR^A$, wire 205, front contact 206 of track relay $TR^A$, wire 207, contact 8—8a of signal mechanism $S^A_1$, wire 17, contact 7—7b of signal mechanism $S^A_1$, wire 208, contact 7—7a of signal mechanism $S^A_2$, wire 221, winding of relay $SR^A$, and wires 199 and 200 back to battery $E^A$.

Each power-off relay POR is controlled in the same manner as in the preceding views and the control of this relay need not, therefore, be repeated.

Each distant relay DR is controlled by the associated track relay TR, by the signal repeater relay SR associated with the two signal mechanisms $S_1$ and $S_2$ of the signal S next in advance, by the track relay TR associated with the signal next in advance, and by the auxiliary relay AR associated with the signal next in advance. Referring particularly to relay $DR^A$, for example, one circuit for this relay passes from battery $E^B$, through wires 180 and 203, front contact 204 of auxiliary relay $AR^B$, wire 205, front contact 206 of track relay $TR^B$, wire 207, contact 8—8a of signal mechanism $S^B_1$, wire 222, winding of approach lighting relay $ALR^B$, wire 233, front contact 224—224a of signal repeater relay $SR^B$, line wire 225, front contact 226 of track relay $TR^A$, wire 227, winding of distant relay $DR^A$, line wire 251, front contact 228—228a of relay $SR^B$, and wires 229 and 200 back to battery $E^B$. Another circuit for relay $DR^A$ is similar to the circuit just traced with the exception that this latter circuit includes back contacts 224—224$^b$ and 228—228$^b$ of signal repeater relay $SR^B$ instead of front contacts 224—224$^a$ and 228—228$^a$ of signal repeater relay $SR^B$. A third circuit for distant relay $DR^A$ is similar to the circuit first traced for this relay with the exception that this latter circuit includes contact 7—7$^a$ of signal mechanism $S^B{}_1$ and wire 17 in place of contact 8—8$^a$ of signal mechanism $S^B{}_1$.

It will be noted that each of the circuits for each distant relay includes the approach lighting relay associated with the signal next in advance, and it follows that each approach lighting relay will be energized except when the block next in the rear of the associated signal, or the block next in advance of the associated signal is occupied.

Each lamp $L_1$ is provided with two energizing circuits one of which is closed when the associated approach lighting relay ALR is deenergized and the associated power-off relay POR is energized, and the other of which is closed when the associated approach lighting relay ALR and power-off relay POR are both deenergized. Referring particularly to lamp $L^A{}_1$, the circuit for this lamp which is closed when approach lighting relay $ALR^A$ is deenergized and power-off relay $POR^A$ is energized may be traced from the right-hand terminal of secondary 41 of transformer $T^A$ through wires 235, 182, 183, 184, 236, the filament of lamp $L^A{}_1$, wire 237, the winding of relay $LOR^A$, wire 238, back contact 239—239$^b$ of approach lighting relay $ALR^A$, wire 240, front contact 241—241$^a$ of power-off relay $POR^A$, and wire 242 to the left-hand terminal of secondary 41 of transformer $T^A$. The circuit for lamp $L^A{}_1$ which is closed when approach lighting relay $ALR^A$ and power-off relay $POR^A$ are both deenergized may be traced from battery $E^A$ through wires 180, 181, 182, 183, 184, and 236, lamp $L^A{}_1$, wire 237, the winding of light-out relay $LOR^A$, wire 238, back contact 239—239$^b$ of approach lighting relay $ALR^A$, wire 240, back contact 241—241$^b$ of power-off relay $POR^A$, and wires 229 and 200 to battery $E^A$.

Each lamp $L_2$ is likewise provided with two circuits one of which is closed when the associated approach lighting relay ALR is deenergized and the associated power-off relay POR is energized and the other of which is closed when the associated approach lighting relay $ALR^A$ is deenergized and the associated power-off relay $POR^A$ is also deenergized. Referring particularly to lamp $L^A{}_2$, for example, the one circuit for this lamp passes from the right-hand terminal of secondary 41 of transformer $T^A$ through wires 235, 182, 183 and 243, the filament of lamp $L^A{}_2$, reactor $J^A$, back contact 250 of approach lighting relay $ALR^A$, wire 240, front contact 241—241$^a$ of power-off relay $POR^A$, and wire 242 to the left-hand terminal of secondary 41 of transformer $T^A$. The other circuit for lamp $L^A{}_2$ may be traced from battery $E^A$, through wires 180, 181, 182, 183 and 243, the filament of lamp $L^A{}_2$, reactor $J^A$, back contact 250 of approach lighting relay $ALR^A$, wire 240, back contact 241—241$^b$ of power-off relay $POR^A$ and wires 229 and 200 to battery $E^A$.

It will be noted that each of the circuits for the lamps $L_1$ includes the winding of the associated light-out relay and that the one circuit is energized by alternating current whereas the other circuit is energized by direct current. Each light-out relay is so constructed that it will operate on either alternating or direct current, and the parts are so proportioned that when either one of the circuits for the associated lamp is closed, the relay will become energized.

It will also be noted that each of the circuits for the lamp $L^A{}_2$ includes a reactor $J^A$ which as was previously pointed out has the same reactance as the winding of the associated light-out relay $LOR^A$. It will further be noted that the circuits for the lamps $L_2$ are supplied with energy from the same sources as the corresponding circuits for the lamps $L_1$, and it follows that both lamps will be supplied with current of the same magnitude.

Each auxiliary relay AR is provided with two circuits, one of which is closed when the associated approach lighting relay ALR is energized and the associated light-out relay LOR is deenergized, and the other of which is closed when the associated light-out relay is energized. Referring particularly to relay $AR^A$, the one circuit for this relay includes the filament of lamp $L^A{}_1$ and passes from battery $E^A$ through wires 180, 181, 182, 183, 184 and 236, the filament of lamp $L^A{}_1$, wire 237, the winding of light-out relay $LOR^A$, wire 238, front contact 239—239$^a$ of approach lighting relay $ALR^A$, wire 244, back contact 245—245$^b$ of light-out relay $LOR^A$, wire 246, the winding of relay $AR^A$, and wire 247 back to battery $E^A$. The other circuit for relay $AR^A$ passes from battery $E^A$, through wires 180, 181 and 182, front contact 245—245$^a$ of light-out relay $LOR^A$, wire 246, the winding of auxiliary relay $AR^A$, and wire 247 back to battery $E^A$.

It will be noted that one circuit for relay AR includes the winding of the associated light-out relay LOR, and the filament of the associated lamp $L_1$. The resistance of each auxiliary relay AR is sufficiently high so that when this circuit is closed, the associated light-out relay LOR will not open its back contacts, and the lamp $L_1$ will not become lighted.

As shown in the drawings, blocks A—B, B—C and C—D are all unoccupied, but the block to the right of point D is occupied by a train W. Track relays $TR^A$, $TR^B$ and $TR^C$ are therefore all energized, but track relay $TR^D$ is deenergized. With track relay $TR^D$ deenergized all circuits for the winding 6 of signal mechanism $S^D{}_1$ are interrupted at front contact 186 of this track relay, and the sole circuit for winding 6 of signal mechanism $S^D{}_2$ is open at front contact 206 of this track relay with the result that the red roundel of both signal mechanisms $S^D{}_1$ and $S^D{}_2$ is disposed in front of the associated lamps $L^D{}_1$ and $L^D{}_2$. Furthermore, with track relay $TR^D$ deenergized, all circuits for relays $DR^C$, $DR^D$, $SR^D$ and $ALR^D$ are open so that these relays are all deenergized. The power-off relays POR are all energized, and since power-off relay $POR^D$ is energized and approach lighting relay $ALR^D$ is deenergized, the circuits for lamps $L^D{}_1$ and $L^D{}_2$ including the secondary 41 of transformer D are both closed. The lamps $L^D{}_1$ and $L^D{}_2$ are therefore both lighted so that signal $S^D$ indicates "stop". Light-out relay $LOR^D$ is energized by virtue of the circuit which is closed for lamp $L^D{}_1$, and auxiliary relay $AR^D$ is therefore energized over the circuit including front contact 245—245$^a$ of relay $LOR^D$.

Track relay $TR^C$ being energized and distant relay $DR^C$ being deenergized, winding 6 of signal mechanism $S^C{}_1$ is supplied with current of reverse polarity and winding 6 of signal mechanism $S^C_2$ is deenergized. The yellow roundel of signal mechanism $S^C_1$ is therefore disposed in front of the associated lamp $L^C_1$, and the red roundel of signal mechanism $S^C_2$ is disposed in front of the lamp $L^C_2$. With the signal mechanisms $S^C_1$ and $S^C_2$ in the positions just described, all circuits for relay $SR^C$ are open, and this relay is therefore deenergized. Since track relays $TR^B$ and $TR^C$ are both energized and relay $SR^C$ is deenergized, distant relay $DR^B$ is energized in the reverse direction and approach lighting relay $ALR^C$ is therefore picked up. Lamps $L^C_1$ and $L^C_2$ are accordingly both extinguished and light-out relay $LOR^C$ is deenergized. Auxiliary relay $AR^C$ is energized over the circuit including the filament of lamp $L^C_1$, front contact 239—239a of relay $AR^C$ and back contact 245—245b of relay $LOR^C$.

With distant relay $DR^B$ energized in the reverse direction and track relay $TR^B$ energized, winding 6 of signal mechanism $S^B_1$ is supplied with current of reverse polarity and winding 6 of signal mechanism $S^B_2$ is supplied with current of normal polarity. Signal mechanism $S^B_1$, therefore, occupies its extreme left-hand position in which the yellow roundel Y of this mechanism is disposed in front of the lamp $L^B_1$ and signal mechanism $S^B_2$ occupies its extreme right-hand extreme position in which the green roundel G of this latter mechanism is disposed in front of the lamp $L^B_2$. Signal mechanism $S^B_1$ and $S^B_2$ being in the positions just described, signal repeater relay $SR^B$ is energized and since track relay $TR^A$ is also energized, distant relay $DR^A$ is energized in the normal direction and approach lighting relay $ALR^B$ is picked up. Approach lighting relay $ALR^B$ being picked up, the lamps $L^B_1$ and $L^B_2$ are both deenergized, and light-out relay $LOR^B$ is also deenergized. With approach lighting relay $ALR^B$ picked up and light-out relay $LOR^B$ deenergized, the circuit for auxiliary relay $AR^B$ including the filament of lamp $L^B_1$ is closed, and this latter relay is therefore also energized.

Distant relay $DR^A$ being energized in its normal direction, winding 6 of signal mechanism $S^A_1$ is supplied with current of normal polarity, so that the green roundel of this signal mechanism is in front of the lamp $L^A_1$, and winding 6 of signal mechanism $S^A_2$ is deenergized, so that the red roundel of this mechanism is in front of the lamp $L^A_2$. Approach lighting relay $ALR^A$ is energized, and all circuits for lamps $L^A_1$ and $L^A_2$ are therefore open at the contacts 239—239b and 250 of relay $ALR^A$. Lamps $L^A_1$ and $L^A_2$ are therefore extinguished, and light-out relay $LOR^A$ is deenergized. The circuit for auxiliary relay $AR^A$ including back contact 245—245b of light-out relay $LOR^A$ and 239—239a of approach lighting relay $ALR^A$ is closed, and this relay is therefore energized. Relay $SR^A$ is energized over the circuit including front contact 204 of relay $AR^A$ and contacts 7—7a and 8—8b of signal mechanism $S^A_1$.

With the apparatus in the positions described when the train W passes out of the section to the right of point D, track relay $TR^D$ will pick up, thereby closing its front contacts 186, 206 and 226. When front contact 186 of track relay $TR^D$ becomes closed, a circuit for winding 6 of signal mechanism $S^D_1$ including this contact and back contacts 191—191b and 195—195b of distant relay $DR^B$ will become closed, and signal mechanism $S^D_1$ will therefore move to its left-hand extreme position in which the yellow roundel Y is disposed in front of the lamp $L^D_1$. As soon as the signal mechanism $S^D_1$ reaches this position, contact 8—8a of this mechanism will become closed, and will complete one of the circuits for distant relay $DR^C$, thus causing this relay to become energized in its reverse direction and approach lighting relay $ALR^D$ to pick up. When approach lighting relay $ALR^D$ picks up, the circuits which were previously closed for lamps $L^D_1$ and $L^D_2$ will become interrupted, and these lamps will then become extinguished and light-out relay $LOR^D$ will become deenergized. The deenergization of light-out relay $LOR^D$ will interrupt the circuit which was previously closed for auxiliary relay $AR^D$ at front contact 245—245a of relay $LOR^D$, and will complete the circuit for relay $AR^D$ including back contact 245—245b of relay $LOR^D$. Relay $AR^D$ will not open its front contact 204, under these conditions, however, because of its slow releasing characteristics.

When distant relay $DR^C$ becomes energized in its reverse direction, in the manner just described, the circuit which was previously closed for winding 6 of signal mechanism $S^C_1$ including back contact 195—195b and 191—191b of relay $DR^C$ becomes interrupted, and another circuit for winding 6 of signal mechanism $S^D_1$ including front contacts 195—195a and 191—191a becomes closed. Signal mechanism $S^C_1$ will remain in the position shown, however, because the current supplied to the winding 6 of this mechanism over both of these circuits flows through the winding in the same direction. The energization of distant relay $DR^C$, under the conditions just described, also completes the circuit for winding 6 of signal mechanism $S^C_2$, and when this circuit becomes closed, the mechanism moves to its extreme right-hand position in which the green roundel G is disposed in front of the lamp $L^C_2$. The movement of the signal mechanism $S^C_2$ to the position just described completes the circuit for signal repeater relay $SR^C$ including front contact 7—7a of signal mechanism $S^C_1$, and relay $SR^C$ therefore picks up, and reverses the polarity of the current supplied to distant relay $DR^B$, thus causing this relay to become energized in its normal direction. When relay $DR^B$ becomes energized in its normal direction, it interrupts the circuit which was previously closed for winding 6 of signal mechanism $S^B_2$, and this signal mechanism therefore moves to its intermediate position in which the red roundel R is disposed in front of the lamp $L^B_2$. When distant relay $DR^B$ becomes energized in its normal direction it also interrupts the circuit which was previously closed for winding 6 of signal mechanism $S^B_1$ at polar contacts 189—189b and 197—197b of this relay, and completes another circuit for winding 6 of signal mechanism $S^B_1$ including polar contacts 189—189a and 197—197a of relay $DR^B$. When this latter circuit for winding 6 of signal mechanism $S^B_1$ is closed, winding 6 is then supplied with current of normal polarity, and the mechanism of signal $S^B_1$ therefore moves to the position in which the green roundel G is disposed in front of the lamp $L^B_1$. The movement of the two signal mechanisms $S^B_1$ and $S^B_2$ from the positions in which they are shown in the drawings to the positions just described, interrupts one circuit for relay $SR^B$ and completes the other circuit for this relay, but due to the slow releasing characteristic of relay $SR^B$, this relay does not open its front contacts under these conditions.

I will now assume that the parts are in the positions shown in the drawings and that the filament of lamp $L^C_1$ becomes interrupted for some reason. Under these conditions the circuit which was previously closed for auxiliary relay $AR^C$ will become interrupted at the lamp filament, and this relay will therefore become deenergized and open its front contact 204. The opening of front contact 204 of relay $AR^C$ will interrupt the circuit which was previously closed for distant relay $DR^B$, thus causing this relay and approach lighting relay $ALR^C$ to become deenergized. The deenergization of approach lighting relay $ALR^C$ will complete one of the energizing circuits for lamp $L^C_2$, thus causing this lamp to become lighted. The deenergization of relay $DR^B$ will interrupt the circuit which was previously closed for winding 6 of signal mechanism $S^B_1$ including contacts 195—195a and 191—191a of relay $DR^B$, and will complete the circuit for winding 6 of signal mechanism $S^B_1$ including contacts 195—195b and 191—191b of relay $DR^B$. This signal mechanism, however, will remain in the position shown since the current supplied to the winding 6 of both these circuits flows through the winding in the same direction. The deenergization of relay $DR^B$ will also interrupt the circuit which was previously closed for winding 6 of signal mechanism $S^B_2$ at front contacts 211 and 214 of this relay, and this winding will therefore now become deenergized, thus causing signal mechanism $S^B_2$ to move to the position in which the red roundel R is disposed in front of the lamp $L^B_2$. When signal mechanism $S^B_2$ moves to this latter position, the opening of contact 7—7a of this signal mechanism will deenergize signal repeater relay $SR^B$ and this relay will therefore reverse the polarity of the current supplied to distant relay $DR^A$, thus causing signal mechanism $S^A_1$ to move from the position shown to the position in which the yellow roundel Y is disposed at the front of the lamp $L^A_1$; and the signal mechanism $S^A_2$ to move from the position shown to the position in which the green roundel G is disposed in front of the associated lamp $L^A_2$. It will be seen, therefore, that when the lamp $L_1$ of a signal burns out when the block next in advance is occupied by a train the signal mechanisms of the signal for the block next in rear will automatically be moved to such positions that if the associated lamps were then lighted due to the presence of a train in the second block in the rear, the signal for the block next in rear would then display a caution indication. It will also be seen that if the lamp $L_1$ of a signal burns out when the block next in advance of the associated block is occupied by a train, the signal mechanisms of the signal for the second block in rear of the section in question will automatically be moved to such positions that if the associated lamps were then lighted due to a train approaching the signal, the signal would display an approach restricting indication. It follows that under either of the conditions just described, an engineman approaching a signal in which the lamp $L_1$ is burned out will receive the same indications when he passes the two signals next in the rear of the signal having the burned out lamp as he would receive if the block immediately in advance of the signal having the burned out lamp were occupied, thus giving him ample opportunity to stop when he finally approaches the signal with the burned out lamp.

I will next assume that with the parts in the positions in which they are shown in the drawings, the lamp $L^B_1$ burns out. Under these conditions, auxiliary relay $AR^B$ will become deenergized and will interrupt the circuit which was previously closed at its contact for winding 6 of signal mechanism $S^B_2$, thus causing this signal mechanism to move from the position in which the green roundel G is disposed in front of the lamp $L^B_2$ to the position in which the red roundel R is disposed in front of the lamp $L^B_2$. When signal mechanism $S^B_2$ moves to this latter position, the circuit which was previously closed for relay $SR^B$ will become interrupted so that this relay will become deenergized but the deenergization of this relay will have no effect on the apparatus because when this relay becomes deenergized, all circuits for relay $DR^A$ will then be open at front contact 204 of relay $AR^B$ and relay $DR^A$ will already be deenergized. The deenergization of relay $DR^A$ will cause signal mechanism $S^A_1$ to move from the position shown to the position in which the yellow roundel Y is disposed in front of the lamp $L^A_1$. As a result, if a train now enters the block to the left of block A—B and causes approach lighting relay $ALR^A$ to become deenergized, signal $S^A$ will indicate caution instead of proceed. It follows that if signal lamp $L_1$ burns out when the two blocks next in advance of the associated signal are both unoccupied, the signal mechanisms of the signal next in the rear of the associated signal will be automatically moved to the same positions as when a lamp burns out, and the block next in advance of the associated signal is occupied.

Although I have herein shown and described only a few forms of signal systems embodying my invention, it is understood that various changes and modifications may be made therein within the scope of the appended claims without departing from the spirit and scope of my invention.

Having thus described my invention, what I claim is:

1. In combination, a stretch of railway track divided into blocks, a signal for each block including a lamp which at times becomes lighted to cause the signal to display an indication, and means for controlling each signal including a circuit which is completed through the filament of the lamp for the signal next in advance when the lamp for such signal next in advance is extinguished but is not burned out.

2. In combination, a stretch of railway track divided into blocks, a signal for governing the entrance of traffic into each block including a lamp which becomes lighted when a train enters the block next in the rear to cause the signal to display an indication, and a relay for controlling each signal connected in series with the filament of the lamp for the signal next in advance when such filament is extinguished.

3. In combination, a stretch of railway track divided into blocks, a signal for governing the entrance of traffic into each block including a lamp which becomes lighted when a train approaches the signal, and means for controlling each signal including a relay which is connected in series with the filament of the lamp for the signal next in advance at all times except when a train is approaching said last mentioned signal.

4. In combination, a stretch of railway track divided into blocks, a signal for governing the entrance of traffic into each block including a lamp and a signal mechanism, said signal being capable of indicating stop, caution, or proceed when the lamp is lighted according as the mechanism is then deenergized or is supplied with current of one polarity or another, a relay associated with each signal, means for deenergizing each signal mechanism when the associated block is occupied and for supplying each signal mechanism with current of said one or said other polarity when the associated block is unoccupied according as the relay associated with the signal next in advance is then deenergized or is energized, means for energizing each relay when and only when the filament for the lamp of the associated signal is unbroken and the associated signal mechanism is supplied with current of the one polarity or the other, and means for lighting each lamp when a train approaches the associated signal.

5. In combination, a stretch of railway track divided into blocks, a signal for governing the entrance of traffic into each block responsive to reversals of polarity of the current supplied thereto and including an electric lamp, a polarized relay associated with each signal, means for supplying each signal with current of one polarity or the other according as the associated polarized relay is supplied with current of one polarity or the other, a second relay associated with each signal, means for supplying each polarized relay with current of one polarity or the other according as the second relay associated with the signal next in advance is energized or deenergized, an energizing circuit for the electric lamp of each signal controlled by traffic conditions in the rear of the signal, and a circuit for the second relay associated with each signal including the filament of the lamp for the signal and closed only when the energizing circuit for such lamp is open.

6. In combination, a stretch of railway track divided into blocks, a signal for governing the entrance of traffic into each block including a signal lamp and a winding, said signal being responsive to the polarity of the current supplied to the winding, an approach lighting relay associated with each signal, a circuit for each signal lamp controlled by the associated approach lighting relay and closed only when the associated approach lighting relay is energized, an auxiliary relay associaterd with each signal; a polarized track circuit for each block including a polarized track relay, the winding of the approach lighting relay associated with the signal for the block next in advance, and pole-changing contacts on the auxiliary relay associated with the signal for the block next in advance; means controlled by each polarized track relay for controlling the polarity of the current supplied to the winding of the associated signal; a first circuit for each auxiliary relay including a front neutral contact of the associated track relay, a back contact of the associated approach lighting relay, and the filament of the lamp for the associated signal; and a second circuit for each auxiliary relay including a front neutral contact of the associated track relay and a front contact of the associated approach lighting relay.

7. In combination, a first and a second section of railway track, an approach energized light signal for each section for governing traffic entering therein, and means rendered effective upon a failure of the light source of the signal for said first section for causing the signal for said second section to display a more restrictive indication at such time as a train approaches the signal for said second section and said two sections are both unoccupied.

8. In combination, a first and a second section of railway track, a first and a second approach lighted signal for governing traffic entering said first and said second section respectively, and means effective when said first signal becomes incapable of providing an indication for causing said second signal to display a more restrictive indication when a train approaches said second signal and said two sections are both unoccupied.

9. In combination, a stretch of railway track divided into blocks, a signal for governing the entrance of traffic into each block and including an operating circuit which becomes energized with operating current when a train enters the block next in the rear to cause the signal to display an indication, and a relay for controlling each signal connected in series with said operating circuit at such time when said operating circuit is not energized with said operating current.

10. In combination, a stretch of railway track divided into blocks, a signal including a single light source comprising an incandescent filament for governing the entrance of traffic into each block, and means for controlling each signal in part by the filament of the lamp for the signal next in advance and effective whenever such filament becomes broken to cause the signal in the rear to display a restrictive indication for an approaching train.

11. In combination, a stretch of railway track divided into blocks, a signal including a single light source comprising an incandescent filament for governing the entrance of traffic into each block, and means for controlling each signal including a relay which is constantly connected in series with the filament of the lamp for the signal next in advance.

12. In combination, a first and a second section of railway track, a light signal for each section comprising a single light source for governing traffic entering therein, and means rendered effective whenever there occurs a failure of the light source of the signal for said first section for causing the signal for said second section to display a restrictive indication for an approaching train.

13. In combination, a stretch of railway track divided into blocks, a signal including a single light source comprising an incandescent filament for governing the entrance of traffic into each block, a polarized circuit associated with each signal and controlled in accordance with traffic conditions for governing the indications of said signals, a constantly energized relay for each signal connected in series with the filament thereof, and means including said relay for controlling the polarized circuit for a rear signal in such manner as to cause said rear signal to display a restrictive indication for an approaching train upon the failure of the lamp filament of the forward signal.

14. In combination, a stretch of railway track divided into blocks, a signal including a single light source comprising an incandescent filament for governing the entrance of traffic into each block, a circuit associated with each signal and controlled in accordance with traffic conditions for governing the indications of said signals, a constantly energized checking relay for each signal for checking the integrity of the filament of the lamp associated therewith, and means including said relay for controlling said circuit for a rear signal in such manner as to cause said rear signal to display a restrictive indication for an approaching train upon the failure of the lamp filament of the forward signal.

15. In combination, a stretch of railway track divided into blocks, a signal including a single light source comprising an incandescent filament for governing the entrance of traffic into each block, a control circuit for each signal extending between signals of adjoining blocks, means for passing current through the filament of each signal lamp, and a relay for each signal controlled by the current passing through the associated lamp filament for governing the control circuit of the signal next in the rear in such manner as to cause said rear signal to display a restrictive indication for an approaching train whenever there occurs a filament failure of the signal next in advance of said rear signal.

16. In combination, a stretch of railway track divided into blocks, a signal including a single light source comprising an incandescent filament for governing the entrance of traffic into each block, a relay for each signal constantly connected in series with the associated lamp filament, and means including said relay for controlling the signal of the block next in the rear.

17. In a railway signaling system, a trackway divided into blocks, signals at the entrance to each block each having an incandescent lamp for providing a plurality of differently characterized indications, a relay in series with the energizing circuit for each incandescent lamp, and means for causing the display of a restrictive indication at a rear signal upon the deenergization of the series relay.

18. In a railway signaling system, a trackway divided into blocks, signals at the entrance to each block each having an incandescent lamp for providing a plurality of differently characterized indications, a relay in series with the energizing circuit for each incandescent lamp, and means for controlling the next signal in the rear by the series relay.

19. In combination with a section of railway track, a signal for governing the entrance of traffic into said section, means governed by traffic conditions for passing energizing current through said signal, means for at times passing a checking current of substantially lower magnitude than said energizing current through said signal, and means effective upon the interruption of the flow of said checking current for controlling the traffic approaching said section.

20. In combination with a section of railway track, a signal for governing the entrance of traffic into said section, means for at times passing energizing current through said signal, means for at other times passing a checking current through said signal, and means effective upon the interruption of said checking current for controlling the traffic approaching said section.

21. In combination with a section of railway track, a signal including an incandescent lamp for governing the entrance of traffic into said section, means governed by traffic conditions in advance of said section for controlling said signal, means for at times passing a checking current through said lamp of insufficient value to cause illumination thereof, a relay operated by said checking current, and means controlled by said relay for governing traffic approaching said section.

22. In combination with a section of railway track, a searchlight signal for said section, a polarized track relay for said section for governing the indication provided by said signal in accordance with the polarity of current received by said relay from the track, an auxiliary relay at times connected in series with the filament of the lamp for said searchlight signal for checking the integrity of said filament, means controlled by said auxiliary relay for governing traffic approaching said section, and other means controlled by said auxiliary relay for preventing the display of a momentary stop indication by said signal during a reversal of said polarized track relay.

23. In combination with a section of railway track, a searchlight signal for said section, a polarized track relay for said section, a normal and a reverse operating circuit for said signal including a neutral contact as well as a normal and a reverse contact respectively of said polarized track relay, an auxiliary relay at times connected in series with the filament of the lamp for said searchlight signal for checking the integrity of said filament, means controlled by said auxiliary relay for governing traffic approaching said section, and a normal and a reverse auxiliary operating circuit for said signal including a front contact of said auxiliary relay as well as said normal and said reverse contact respectively of the polarized relay but excluding said neutral contact.

24. In combination with a section of railway track, a searchlight signal for said section, means for supplying the mechanism of said signal with current of normal or reverse polarity to thereby cause said mechanism to assume its normal or reverse position respectively, a normal and a reverse contact for said mechanism closed when the mechanism occupies its normal or reverse position respectively, an auxiliary relay controlled over a circuit which includes the filament of the lamp for said signal as well as said normal or said reverse contact of the mechanism depending upon the position thereof, said auxiliary relay having a slow acting interval sufficient to bridge the reversal of said mechanism, and means controlled by said auxiliary relay for governing traffic approaching said section.

25. In combination with a section of railway track, a normally deenergized light signal for governing the entrance of traffic into said section, an approach lighting relay for energizing said signal when a train approaches said section, an auxiliary relay for governing traffic approaching said section, a first circuit for energizing said auxiliary relay including a front contact of said approach lighting relay, and a second circuit for energizing said auxiliary relay including a back contact of said approach lighting relay and the lamp filament of said light signal.

26. In combination with a section of railway track, a normally deenergized light signal for governing the entrance of traffic into said section, an approach lighting relay for energizing said signal when a train approaches said section, an auxiliary relay for governing traffic approaching said section, a first circuit for energizing said auxiliary relay including a front contact of said approach lighting relay and the lamp filament of said light signal, and a second circuit for energizing said auxiliary relay including a back contact of said approach lighting relay and said lamp filament.

27. In combination with a section of railway track, a normally deenergized light signal for governing the entrance of traffic into said section, an approach lighting relay for energizing said signal when a train approaches said section, a slow acting auxiliary relay capable of bridging the operation of said approach lighting relay for governing traffic approaching said section, a first circuit for energizing said auxiliary relay including a front contact of said approach lighting relay, and a second circuit for energizing said auxiliary relay including a back contact of said approach lighting relay and the lamp filament of said light signal.

28. In combination with a section of railway track, a normally deenergized light signal for governing the entrance of traffic into said section, an approach lighting relay for energizing said signal when a train approaches said section, an auxiliary relay having a low current and a high current winding for governing traffic approaching said section; a first circuit for energizing said auxiliary relay including a front contact of said approach lighting relay, said high current winding, and the lamp filament of said light signal; and a second circuit for energizing said auxiliary relay including a back contact of said approach lighting relay, said low current winding, and said lamp filament.

29. In combination with a section of railway track, a light signal for governing the entrance of traffic into said section, means effective when a train approaches said section for lighting said signal, a relay having a low current and a high current winding for governing traffic approaching said section, a first circuit for energizing said relay effective when said signal is not lighted and including said low current winding and the lamp filament of said light signal, and a second circuit for energizing said relay effective when said signal is lighted and including said high current winding and said lamp filament.

30. In combination with a section of railway track, a normally deenergized light signal for governing the entrance of traffic into said section, an approach lighting relay for energizing said signal when a train approaches said section, a light-out relay for said light signal, an energizing circuit for said light-out relay including a front contact of said approach lighting relay and the lamp filament of said light signal, an auxiliary relay for governing traffic approaching said section, a first circuit for energizing said auxiliary relay including a front contact of said light-out relay, and a second circuit for energizing said auxiliary relay including a back contact of said light-out relay and said lamp filament.

31. In combination with a section of railway track, a normally deenergized light signal for governing the entrance of traffic into said section, a light-out relay for said signal, means including the winding of said light-out relay effective when a train approaches said section for lighting said signal, an auxiliary relay for governing traffic approaching said section, a first circuit for energizing said auxiliary relay including a front contact of said light-out relay, and a second circuit for energizing said auxiliary relay including a back contact of said light-out relay and the lamp filament of said light signal.

32. In combination with a section of railway track, a signal for governing the entrance of traffic into said section, a first circuit for checking the integrity of said signal effective when said signal is energized, a first checking relay included in said first circuit, a second circuit for checking the integrity of said signal effective when said signal is deenergized and including a contact of said first checking relay, a second checking relay also included in said second circuit, and means controlled by said second checking relay for governing traffic approaching said section.

33. In combination with a section of railway track, a signal for governing the entrance of traffic into said section, a first circuit for checking the integrity of said signal effective when said signal is energized, a first checking relay included in said first circuit, a second checking relay, a second circuit for checking the integrity of said signal effective when said signal is deenergized and including both said first and said second checking relays, means controlled by said first checking relay effective when said signal is energized for governing said second checking relay, and means controlled by said second checking relay for governing traffic approaching said section.

34. In combination with a section of railway track, a light signal for governing the entrance of traffic into said section, a light-out relay, a circuit for lighting said signal including the winding of said light-out relay, an auxiliary relay for governing traffic approaching said section, a first circuit for energizing said auxiliary relay effective when said signal is lighted and including a front contact of said light-out relay, a second circuit for energizing said auxiliary relay effective when said signal is unlighted and including the winding of said light-out relay and the lamp filament of said light signal.

35. In combination with a section of railway track, a normally deenergized light signal for governing the entrance of traffic into said section; an approach lighting relay, a light-out relay, and an auxiliary relay for said section; a circuit for lighting said signal including a front contact of said approach lighting relay and the winding of said light-out relay, a first circuit for energizing said auxiliary relay including a front contact of said light-out relay; a second circuit for said auxiliary relay including a back contact of said approach lighting relay, the winding of said light-out relay, and the lamp filament of said light signal; and means controlled by said auxiliary relay for governing traffic approaching said section.

36. In combination, a stretch of railway track divided into blocks, a two-winding relay for each block, a signal for each block controlled by the associated relay and by the signal next in advance and including a lamp which at times becomes lighted to cause the signal to display an indication, a first circuit for each lamp including one winding of the associated relay and effective when closed for lighting the lamp and for energizing the relay, and a checking circuit for each lamp including the other winding of the relay and effective when closed for energizing the relay but ineffective for lighting the lamp.

HENRY S. YOUNG.